US010962634B2

(12) United States Patent
Gulden et al.

(10) Patent No.: US 10,962,634 B2
(45) Date of Patent: Mar. 30, 2021

(54) METHOD IN A RADAR SYSTEM, RADAR SYSTEM, AND/OR DEVICE OF A RADAR SYSTEM

(71) Applicant: SYMEO GMBH, Neubiberg (DE)

(72) Inventors: Peter Gulden, Erding (DE); Martin Vossiek, Fuerth (DE)

(73) Assignee: SYMEO GMBH, Neubiberg (DE)

( * ) Notice: Subject to any disclaimer, the term of this patent is extended or adjusted under 35 U.S.C. 154(b) by 259 days.

(21) Appl. No.: 15/129,404

(22) PCT Filed: Mar. 23, 2015

(86) PCT No.: PCT/DE2015/100119
§ 371 (c)(1),
(2) Date: Sep. 26, 2016

(87) PCT Pub. No.: WO2015/144134
PCT Pub. Date: Oct. 1, 2015

(65) Prior Publication Data
US 2017/0176583 A1 Jun. 22, 2017

(30) Foreign Application Priority Data
Mar. 26, 2014 (DE) .................... 10 2014 104 273.5

(51) Int. Cl.
G01S 13/32 (2006.01)
G01S 13/87 (2006.01)
(Continued)

(52) U.S. Cl.
CPC .............. G01S 13/32 (2013.01); G01S 7/023 (2013.01); G01S 13/003 (2013.01); G01S 13/10 (2013.01);
(Continued)

(58) Field of Classification Search
CPC ...... G01S 13/32; G01S 13/9029; G01S 13/10; G01S 13/50; G01S 7/023; G01S 13/003;
(Continued)

(56) References Cited

U.S. PATENT DOCUMENTS 5,191,344 A * 3/1993 Moreira .................. G01S 13/90
342/195
5,784,022 A * 7/1998 Kupfer ................ G01S 13/4418
342/149
(Continued)

FOREIGN PATENT DOCUMENTS

CN 1187882 A 7/1998
DE 101 57 931 C2 12/2003
(Continued)

OTHER PUBLICATIONS

English translation of description of WO2010019975 (Year: 2010).*
(Continued)

Primary Examiner — Frank J McGue
(74) Attorney, Agent, or Firm — Schwegman Lundberg & Woessner, P.A.

(57) ABSTRACT

The invention relates to a method in a radar system, wherein: in a first non-coherent transmitting-receiving unit (NKSE1), a first signal (sigTX1) is generated and is transmitted, in particular emitted, via a path (SP); in a further, in particular second non-coherent transmitting-receiving unit (NKSE2), a first signal (sigTX2) is generated and is sent, in particular emitted, via the path (SP); in the first transmitting-receiving unit (NKSE1), a comparison signal (sigC12) is formed from the first signal (sigTX1) of the first transmitting-receiving unit and from such a first signal (sigTX2) received from the further transmitting-receiving unit (NKSE2) via the path (SP); and in the further transmitting-receiving unit (NKSE2), a further comparison signal (sigC21) is formed from the first signal (sigTX2) of the further transmitting-
(Continued)

receiving unit and from such a first signal (sigTX1) received from the first transmitting-receiving unit (NKSE1) via the path (SP), wherein the further comparison signal (sigC21) is transmitted, in particular communicated, to the first transmitting-receiving unit (NKSE1) by the further transmitting-receiving unit (NKSE2). The invention further relates to a radar system and to a device of a radar system that perform such a method.

30 Claims, 6 Drawing Sheets

(51) Int. Cl.
| | |
|---|---|
| *G01S 13/34* | (2006.01) |
| *G01S 13/00* | (2006.01) |
| *G01S 7/02* | (2006.01) |
| *G01S 13/10* | (2006.01) |
| *G01S 13/50* | (2006.01) |
| *G01S 13/90* | (2006.01) |
| *G01S 13/74* | (2006.01) |
| *G01S 13/02* | (2006.01) |
| *G01S 13/46* | (2006.01) |

(52) U.S. Cl.
CPC .............. *G01S 13/34* (2013.01); *G01S 13/50* (2013.01); *G01S 13/878* (2013.01); *G01S 13/9029* (2013.01); *G01S 13/74* (2013.01); *G01S 13/90* (2013.01); *G01S 2013/0245* (2013.01); *G01S 2013/468* (2013.01)

(58) Field of Classification Search
CPC .. G01S 13/34; G01S 13/878; G01S 2013/468; G01S 2013/0245; G01S 13/74; G01S 13/90
USPC .......................................................... 342/95
See application file for complete search history.

(56) References Cited

U.S. PATENT DOCUMENTS

| 5,861,845 | A | * | 1/1999 | Lee | ............... | H01Q 3/22 |
|---|---|---|---|---|---|---|
| | | | | | | 342/374 |
| 6,127,966 | A | * | 10/2000 | Erhage | ................. | G01S 7/4026 |
| | | | | | | 342/165 |
| 8,108,558 | B2 | | 1/2012 | Kirsch et al. | | |
| 8,299,959 | B2 | | 10/2012 | Vossiek et al. | | |
| 2001/0004601 | A1 | * | 6/2001 | Drane | ..................... | G01S 1/024 |
| | | | | | | 455/456.1 |
| 2005/0030935 | A1 | | 2/2005 | Seisenberger et al. | | |
| 2007/0290916 | A1 | * | 12/2007 | Ofek | ......................... | G01S 7/36 |
| | | | | | | 342/19 |
| 2014/0022111 | A1 | | 1/2014 | Kuehnle et al. | | |

FOREIGN PATENT DOCUMENTS

| DE | 10 2005 000732 A1 | 7/2006 | | |
|---|---|---|---|---|
| DE | 10 2008 010536 A1 | 8/2009 | | |
| DE | 10 2009 030075 A1 | 12/2010 | | |
| DE | 10 2012 212888 A1 | 1/2014 | | |
| EP | 2602636 A1 | 6/2013 | | |
| JP | 2008-527339 A | 7/2008 | | |
| WO | WO-2010/019975 A1 | 2/2010 | | |
| WO | WO2010019975 | * | 2/2010 | ............... G01S 7/00 |

OTHER PUBLICATIONS

International Search Report for Application No. PCT/DE2015/100119, dated Sep. 22, 2015.
Kong et al., "Wireless Cooperative Synchronization of Coherent UWB MIMO Radar," IEEE Transactions on Microwave Theory and Techniques, 62(1):154-165 (2014).
Miesen et al., "UHF RFID Localization Based on Synthetic Apertures," IEEE Transactions on Automation Science and Engineering, 10(3):807-815 (2013).
Scheiblhofer et al., "Performance Analysis of Cooperative FMCW Radar Distance Measurement Systems," Microwave Symposium Digest, pp. 121-124 (2008).
Search Report for German Application No. 10 2014 104273.5, dated Nov. 17, 2014.
Stelzer et al., "Precise Distance Measurement with Cooperative FMCW Radar Units," Radio and Wireless Symposium, pp. 771-774 (2008).
Vossiek et al., "Inverse Synthetic Aperture Secondary Radar Concept for Precise Wireless Positioning," IEEE Transactions on Microwave Theory and Techniques, 55(11):2247-2453 (2007).
Xu et al., "Survey on the Radar-Based Communication System," (2014). Retrieved from the Internet at: URL:http://www.researchgate.net/publicaton/268802143.
International Report on Patentability for Application No. PCT/DE2015/100119, dated Sep. 27, 2016.
Feger, R. et al., "A 77-GHz Cooperative Secondary Radar System for Local Positioning Applications," (2012).
Feger, R. et al., "A 77-GHz FMCW MIMO Radar Based on Loosely Coupled Stations," (2012).
Office Action issued in Chinese Patent Application No. 201580026040.6 dated Aug. 3, 2018.
Office Action issued in Japanese Patent Application No. 2017-501462 dated Feb. 26, 2019.
Decision of Final Rejection for Japanese Application No. 2017-501462, dated Jan. 31, 2020.
"Indian Application Serial No. 201617032382, First Examination Report dated Jun. 24, 2020", 7 pgs.

* cited by examiner

METHOD IN A RADAR SYSTEM, RADAR SYSTEM, AND/OR DEVICE OF A RADAR SYSTEM

The invention relates to a method in a radar system, a radar system and an apparatus of a radar system. In particular, this applies to a radar arrangement with distributed transmitting-receiving units.

It is distinguished in radar technology between primary radars and secondary radars. Primary radar designates radar systems which analyse passively reflected signal echoes of previously transmitted high-frequency signals. In the case of secondary radar, the high-frequency signals which were previously transmitted by a first radar unit are received in a second radar unit. The latter then actively transmits a response signal to the first radar unit. Secondary radars are sometimes referred to as transponder systems, wherein in this case the first radar unit is frequently designated as the base station and the second radar unit as the transponder. A primary radar system receives and processes a separate signal which is transmitted by itself, whereas a secondary radar system receives and processes a foreign signal generated in a different unit.

Radar methods with synthetic aperture (SA) are known both for radar imaging and also for locating transponders. Established methods and embodiments can be found for example in the reference book "Inverse Synthetic Aperture Radar Imaging with Matlab Algorithms", chapter 3 and 4, or in R. Miesen, F. Kirsch and M. Vossiek, "UHF RFID Localization Based on Synthetic Apertures", IEEE Transactions on Automation Science and Engineering, vol. 10, no. 3, pp. 807-815, July 2013, or in G. Li, R. Ebelt and M. Vossiek, "A Novel Sequential Monte Carlo Method Based Synthetic Aperture Reconstruction Approach for Real-Time 3D Wireless Local Positioning", Frequency: Journal of RF-Engineering and Telecommunications, vol. 66, no. 11-12, pp. 363-371, November 2012. SA methods are also known from U.S. Pat. No. 7,948,431 B2, U.S. Pat. No. 8,299,959 B2 and the prior art outlined in these specifications.

It is generally known that SA methods can be carried out with all coherent waveforms, e.g. with electromagnetic ones in the field of radar. In the field of radar sensors, reference is mostly made in this context to SAR (Synthetic Aperture Radar) or also SDRS (Software-Defined Radar Sensors) or MIMO (multiple input multiple output) radar.

Signals of sources of waves whose progression and coherence is not known by the receiver can be processed by SA methods if a signal is formed from signals received at least two spatially separated locations, which signal no longer describes an absolute phase but phase differences of the signals. This approach is also known from the concept of radar interferometry or described for the field of radiometry in Ruf, C. S.; Swift, C. T.; Tanner A. B.; Le Vine, D. M., "Interferometric synthetic aperture microwave radiometry for the remote sensing of the Earth," Geoscience and Remote Sensing, IEEE Transactions on, vol. 26, no. 5, pp 597, 611, September 1988. It is also necessary to demand for this method that the signals received at least two spatially separated locations are received by coherently operating receivers in order to thus enable the determination of the phase differences between the at least two signals. It is impossible however to determine a distance from the source of the waves with only two receiving locations in such a method.

A plurality of secondary radar methods are further known, such as those described for example in U.S. Pat. No. 7,940,743 B2, in Stelzer, A., Fischer, A., Vossiek, M.: "A New Technology for Precise Position Measurement-LPM", Microwave Symposium Digest, 2004, IEEE MTT-S International, Vol. 2, 6-11, June 2004, pp. 655-658, or in R. Gierlich, J. Huttner, A. Ziroff, and M. Huemer, "Indoor positioning utilizing fractional-N PLL synthesiser and multichannel base stations", Wireless Technology, 2008, EuWit 2008, European Conference on, 2008, pp. 49-52.

It is also known in the field of radar radiolocation and communication technology to separate the signals of several transmitters by multiplex operation. Code-time or frequency-multiplex are current multiplex methods. It is explained for example in Roehr, S.; Gulden, P.; Vossiek, M., "Precise Distance and Velocity Measurement for Real Time Locating in Multipath Environments Using a Frequency-Modulated Continuous-Wave Secondary Radar Approach", Microwave Theory and Techniques, IEEE Transactions on, vol. 56, no. 10, pp. 2329, 2339, October 2008, how multiplexing with FMCW signals (FMCW: Frequency Modulated Continuous Wave) can be realised. OFDM signals (OFDM: Orthogonal Frequency-Division Multiplexing) are used for the multiplexing in Sturm, Christian, et al., "Spectrally interleaved multi-carrier signals for radar network applications and multi-input multi-output radar", IET Radar, Sonar & Navigation, 2013, $7^{th}$ Year, No. 3, pp. 261-269, and in GUTIERREZ DEL ARROYO, Jose R., JACKSON, Julie Ann; TEMPLE, Michael A., "Receive signal processing for OFDM-based radar imaging", in *Acoustics, Speech and Signal Processing (ICASSP), 2013 IEEE International conference on*, IEEE, 2013, pp. 2775-2779.

Radar methods are known which use so-called multi-ramp FMCW signals for measuring the distance and velocity, e.g. from Ali. F.; Vossiek, M., "Detection of weak moving targets based on 2-D range-Doppler FMCW radar Fourier processing", German Microwave Conference, 2010, pp. 214, 217, 15-17, March 2010, and the prior art cited therein, and from US020140022111A1.

Generally known are secondary radar methods and secondary radar arrangements from Scheiblhofer, Stefan, et al., "Performance analysis of cooperative FMCW radar distance measurement systems", in: Microwave Symposium Digest, 2008 IEEE MTT-S International, IEEE, 2008, pp. 121-124, and Roehr, S.; Gulden, P.; Vossiek, M., "Precise Distance and Velocity Measurement for Real Time Locating in Multipath Environments Using a Frequency-Modulated Continuous-Wave Secondary Radar Approach", Microwave Theory and Techniques, IEEE Transactions on, vol. 56, no. 10, pp. 2329, 2339, October 2008. These methods are either based on non-coherent synchronisation or the transmission of the difference of the frequency of the down-converted signals. Both methods are therefore unsuitable for the coherent distance measurement and as a basis for an SAR method.

It is the object of the invention to propose an alternative method and system arrangement which allows coherent distance measurement between units. In particular, it is intended to enable a highly precise distance measurement between secondary radar units and, for radar in general, a synthesising of greater apertures and/or a higher achievable resolution.

This object is achieved by a method in a radar system with the features of claim 1, a radar system according to claim 12 and an apparatus of a radar system with the features of claim 16. Advantageous embodiments are the subject matter of dependent claims.

A method in a radar system is therefore especially preferred in which a first signal is generated in a first non-coherent transmitting-receiving unit and is transmitted, especially emitted, via a path, a first signal is generated in a further, especially second, non-coherent transmitting-receiving unit and is transmitted, especially emitted, via the path, a comparison signal is formed in the first transmitting-receiving unit from its first signal and from such a first signal received from the further transmitting-receiving unit via the path, and a further comparison signal is formed in the further transmitting-receiving unit from its first signal and from such a first signal received from the first transmitting-receiving unit via the path, wherein the further comparison signal is transmitted, especially communicated, from the further transmitting-receiving unit to the first transmitting-receiving unit.

The term "first signal" instead of only "signal" is used especially as a conceptual distinction in relation to the comparison signals and comparison-comparison signals. Such a one of the comparison signals especially corresponds to a comparison signal which is generated in a first comparison stage in one of the two transmitting-receiving units, wherein the comparison signal of at least one of the two transmitting-receiving units is transmitted to at least the other of the transmitting-receiving units.

In so far as the terms "second", "further" or "other" are used, this concept is used especially for distinguishing a signal or a component in or from a first of such transmitting-receiving units in relation to at least one respective signal or a respective component of at least a second one of such transmitting-receiving units which interacts with the first of such transmitting-receiving units for carrying out the method or as a system component.

The path is especially an air interface via which the signals and the comparison signals are transmitted and received by means of antennas.

In so far as calculations, evaluations or other method steps are carried out in the transmitting-receiving unit, this shall also include an optionally separate corporeal evaluation device which is connected to the transmitting-receiving unit. For example, the transmitting-receiving unit can thus be formed as an arrangement especially consisting of one or several antennas with a few signal-generating or signal-processing components, whereas further components such as the signal comparison units or an evaluation device are connected as constructively separate components to such an arrangement. In so far as components can be used, they can be formed, if technically feasible, as so-called hardware consisting of processing components, and/or can be implemented entirely or partly in signal- or data-processing steps carried out in a processor.

It is thus advantageously possible that improved data-processing is enabled in the first transmitting-receiving unit, because the comparison signal transmitted into said first transmitting-receiving unit includes information content or data especially on a clock or phase and frequency state of the other transmitting-receiving unit, and thus a coherence or a coherently appearing signal can be reconstructed and evaluated for an evaluation device disposed in the transmitting-receiving unit or connected thereto.

It is also advantageous that by determining the comparison signal a signal of lower frequency is present which requires a lower number of scanning points for clear representation. As a result, the contained information can be transmitted more easily to the other transmitting-receiving unit or units. Especially for signals in the frequency range above 1 GHz, the lower scanning rate for the comparison signal is very advantageous for technical information and is therefore desirable. The reduction in the need for memory by the lower data quantity is also advantageous.

One embodiment provides that a comparison-comparison signal is formed from said comparison signal and the further comparison signal. Such a comparison-comparison signal especially corresponds to a signal which is generated in a second comparison stage in one of the two transmitting-receiving units from two such comparison signals, wherein the comparison signal especially originates from the transmitting-receiving unit itself and the other comparison signal used for the comparison was transmitted from another transmitting-receiving unit. Such a comparison-comparison signal is a signal with the properties of a signal especially in a secondary radar system which can otherwise be generated by a primary radar system.

One embodiment provides that the comparison-comparison signal corresponds to a comparison signal generated by a coherent radar system in that the two comparison signals are processed with each other, especially multiplied in a conjugated complex way.

In particular, a method can thus be carried out in a radar system in which a comparison-comparison signal is formed in such a way that in a first non-coherent transmitting-receiving unit a comparison signal is formed from a first signal generated by said transmitting-receiving unit itself and from a first signal generated in a further, especially second, non-coherent transmitting-receiving unit and transmitted, especially emitted, via a path, and subsequently the comparison-comparison signal is formed from said comparison signal and a further comparison signal, wherein the further comparison signal is formed in the further transmitting-receiving unit in the respective manner from a first signal generated therein and from such a first signal from the first transmitting-receiving unit received therein via the path and is transmitted, especially communicated, to the first transmitting-receiving unit.

In particular, a method can thus be carried out in a radar system in which a comparison-comparison signal is formed in such a way that in a first non-coherent transmitting-receiving unit a first signal is generated and a comparison signal is formed from the first signal and from a first signal received from a further, especially second, non-coherent transmitting-receiving unit, wherein the first signal is generated by the further transmitting-receiving unit and is transmitted, especially emitted, to the first transmitting-receiving unit via a path, a further comparison signal is formed in the respective manner in the further transmitting-receiving unit from such a first signal generated therein and from such a first signal of the first transmitting-receiving unit received via the path, and is transmitted, especially communicated, to the first transmitting-receiving unit, and the comparison-comparison signal is formed from said comparison signal and the further comparison signal.

In particular, a method can thus be carried out in a distributed radar system with at least two spatially separated transmitting-receiving units as radar units in which the transmitting-receiving units each comprise a signal generator, wherein the signal generators generate signals which are mutually exchanged between the radar units, and wherein the transmitting-receiving units comprise communication means, wherein at least one of the comparison signals of a transmitting-receiving unit in which it is formed is transmitted to at least one other transmitting-receiving unit by means of the communication means, and wherein at least one of the transmitting-receiving units comprises a second or further comparison unit and said second comparison unit is supplied with the determined comparison signals of the two first comparison units of the two transmitting-receiving units, and in said second comparison unit at least one mixing process or a correlation is carried out and a comparison-comparison signal is thus formed in such a way that one feature of said comparison-comparison signal is proportional to the signal propagation delay which a signal requires for the distance between the transmitting-receiving units, wherein the feature is the phase or phase progression or the frequency of the comparison signal or the position of a pulsed signal maximum in the comparison signal.

This method or an arrangement that carries out said method is advantageous for highly precise distance measurement between secondary radar units. This method or an arrangement that carries out said method according to a further embodiment is advantageous in order to enable a generally greater aperture or a higher achievable resolution for radar. A technically simpler realisation of an array is advantageously provided for greater apertures, since in particular a previously necessary complex distribution of high-frequency signals is no longer required.

One embodiment is that at least one of the comparison signals, the further comparison signals or the comparison-comparison signals is formed by at least one by mixing or correlation.

At least one mixing process is preferably carried out in a further comparison unit or the second comparison process and a comparison-comparison signal is thus formed, and a signal is determined or calculated from said comparison-comparison signal by means of a Fourier transformation. A distance and/or a spatial position and/or a velocity of an object or a second radar unit used as a transmitting-receiving unit is determined from said determined or calculated signal.

At least one comparison-comparison signal is preferably formed in a further comparison unit or the second comparison process and at least one phase or a phase value and/or at least one frequency value is determined from said comparison-comparison signal by means of a Fourier transformation. In particular, a distance and/or velocity value is determined, especially calculated, by at least one of said phase or frequency values.

A correlation can be used instead of mixing or in addition thereto.

One embodiment is that at least one such further comparison signal is transmitted between the transmitting-receiving units as at least one of data, a data-containing signal, or a signal containing data in a reconstructive manner.

This ensures that the data content of the comparison signal is received by the receiver in an undistorted manner or can be reconstructed therefrom. Distortions or disturbing effects are thus avoided in the comparison of the comparison signals, which distortions or disturbing effects could occur as a result of signal distortions in the transmission of the data contained in the signal. Data shall especially be transmitted or communicated as such, especially digital data, wherein such data can be transmitted via transmission by means of an antenna to an ambient environment of the antenna or also by means of lines. It is also advantageous that only necessary portions of the signal are especially transmitted in this case and that the signal can be transmitted in a compressed/preprocessed form and thus the requirements placed on the data rate in communication are lower.

One embodiment is that at least one of the first signals is transmitted as a transmission signal via the path formed as an air interface. The transmission of the first signals can thus occur in a conventional manner in such a way that a radar signal is transmitted or emitted as an analog signal via a transmitting antenna to the ambient environment of the transmitting antenna.

One embodiment is that the points in time for the transmission of the first signals are coordinated in such a way that the first signals at least partly overlap each other in a temporal respect. This especially leads to a preliminary synchronisation of the transmitting-receiving units transmitting the first signals in such a way that the signals overlap, especially by at least one quarter of their signal length or modulation period, preferably by more than half of their signal length or modulation period. A lower bandwidth is advantageously required in the case of such an implementation, which bandwidth needs to be considered in the signal generation and in the dimensioning of the required components. Furthermore, range is improved because both signals are present over a longer period of time.

One embodiment is that a signal propagation delay which is required by such a first signal for the path between the transmitting-receiving units is determined from at least one comparison-comparison signal, in that at least one of a phase or phase value, a frequency, amplitude progression or a phase progression of the comparison-comparison signal is analysed.

A distance between the involved transmitting-receiving units can especially be determined from the signal propagation delay. Frequencies with spectral analysis, especially Fourier transformation, phase values analytically or with Fourier transformation, an amplitude progression from an amplitude-time diagram and/or a phase progression from a phase-to-time diagram can be determined as a method for determining the signal propagation delay. In particular, a phase, a frequency, an amplitude progression, a phase progression of the comparison-comparison signal, or a position of a pulsed signal maximum in the comparison-comparison signal can be determined in a deterministic manner by the signal propagation delay.

A correlation operation is especially carried out in the second comparison process and a comparison-comparison signal is thus formed, and in said comparison-comparison signal at least one pulsed signal maximum or a pulse is detected. The temporal position of the pulse in the comparison signal or a phase value or a frequency of at least one detected pulse is subsequently determined and at least one of these previously determined position, phase or frequency values is used for calculating a distance or velocity value.

One embodiment is that at least one of the first signals is generated and transmitted as an FMCW- or OFDM-modulated signal. FMCW-modulated signals allow an especially simple evaluation of the comparison-comparison signal via a Fourier transformation. Furthermore, they are principally especially suitable for distance measurement because their time-frequency connection is especially well known. Furthermore, FMCW signals can be generated with low technical effort. OFDM signals are especially advantageous for communication systems. They thus allow advantageous integration of the method in communication systems.

One embodiment is that at least one of the first signals is generated and transmitted as a multi-ramp signal. This advantageously leads to good velocity determination and target separation.

One embodiment is that several comparison-comparison signals are measured in temporal succession by at least two transmitting-receiving units, of which at least one of the transmitting-receiving units is moved, and at least one of the distance, a position, a velocity or the presence of one of the transmitting-receiving units or the presence of one of such transmitting-receiving units or at least one of a distance, position, velocity relative to an object or the presence of an object is determined by a synthetic aperture method.

For this purpose, the distance is measured for example via the direct path between the transmitting-receiving units as in a secondary radar, and the distance between the two units with respect to each other is thus determined. The distance between the transmitting-receiving units can thus also be determined or measured via a reflection on an object as a passive target. The distance and position of the object can then also be determined with the known position of the units.

A radar system is especially preferred in which
at least one first non-coherent transmitting-receiving unit is formed to generate a first signal and to transmit, especially emit, said signal via a path,
at least one further, especially second, non-coherent transmitting-receiving unit is formed to generate a first signal and to transmit, especially emit, said signal via the path,
the first transmitting-receiving unit is formed to form a comparison signal from its first signal and from such a first signal received from the further transmitting-receiving unit via the path,
the further transmitting-receiving unit is formed to form a further comparison signal from its first signal and from such a first signal received from the first transmitting-receiving unit via the path, and
the further comparison signal is transmitted, especially communicated, by the further transmitting-receiving unit to the first transmitting-receiving unit.

One embodiment is that in the radar system a comparison-comparison signal is formed from said comparison signal and the further comparison signal.

One embodiment consists in the radar system with three or more spatially spaced transmitting-receiving units, in which from two or more comparison-comparison signals, which are measured with more than two pairs from two each of the spatially spaced transmitting-receiving units, a distance, a position, a velocity or the presence of one of the transmitting-receiving units or the presence of such transmitting-receiving units or at least one of a distance, a position, a velocity relative to an object or the presence of an object is determined.

Aperture matrixes are thus formed by the arrangement, whose evaluation allows the determination of the angle of incidence. An aperture can be covered alternatively by only one transmitting-receiving unit and the angle of incidence can then be determined by means of a synthetic aperture method.

One embodiment is the radar system in which the first transmitting-receiving unit and at least one such further transmitting-receiving unit and/or an evaluation device are formed for carrying out such a method. Such an evaluation device is especially a component of one or both transmitting-receiving units or is connected to one or several of such transmitting-receiving units.

An apparatus of such a radar system is preferred, especially for carrying out such a method and/or in such a radar system, wherein the apparatus is formed as one first non-coherent transmitting-receiving unit, especially the first non-coherent transmitting-receiving unit, and comprises a signal generator and at least one antenna, which are formed to generate a first signal and to transmit, especially emit, said signal via a path,
having an arrangement which is formed to form a comparison signal from the first signal and from such a first signal received from a further transmitting-receiving unit via the path,
and at least one from an interface which is formed to transmit, especially communicate, the comparison signal to the further transmitting-receiving unit, or comprises an interface which is formed to receive such a further comparison signal generated by the further transmitting-receiving unit by means of transmission, especially communication, in the first transmitting-receiving unit.

One embodiment consists of an apparatus with a further comparison unit which forms a comparison-comparison signal from the comparison signal formed in the same transmitting-receiving unit and the comparison signal transmitted to said transmitting-receiving unit.

The arrangement which outputs the comparison signal and the comparison unit are especially formed as a mixer or correlator. Processing, especially a correlation process, is thus carried out. The distance or the position or the velocity of an object or such from said transmitting-receiving unit is especially determined from the finally formed comparison-comparison signal.

One embodiment consists of an apparatus in which the at least one interface is a data interface. This allows transmitting the first comparison signal as data, especially as a data signal containing digital data, between the transmitting-receiving units.

One embodiment consists of an apparatus in which a filter is arranged between the arrangement which outputs the comparison signal and the further comparison unit which forms the comparison-comparison signal, wherein the filter applies the comparison signal to the comparison unit, wherein the filter does not apply a further comparison signal formed in the arrangement upstream of the filter and suppresses the comparison signal formed in the upstream arrangement or provides it at a connection.

As a result, the further comparison signal which is produced by a back reflection from the transmitting antenna of the transmitting-receiving unit to its receiving antenna can only be kept away from the further comparison unit or can be provided at a separate output or connection for further processing. Such an arrangement is especially advantageous in the use of CW signals and considers a passive radar content which is produced by back or transverse reflection.

One embodiment consists of an apparatus which comprises a plurality of mutually spatially spaced receiving antennas, which is each associated with an arrangement which is formed to respectively form a comparison signal from the first signal and from such a first signal received from such a further transmitting-receiving unit via the path.

A coherent multi-channel receiver is formed in this manner, which emulates a spatial aperture which generates a plurality of comparison-comparison signals with a measurement or transmission of the first signals and enables respective evaluations of angular positions of the apparatuses for example with respect to each other and/or in space.

A method is thus especially preferred for generating coherent radar signals with several transmitting-receiving units operating incoherently with respect to each other and arrangements for carrying out the method as well as novel distributed radar systems for detecting and imaging by using the method and the arrangements. The coherence is especially produced via postprocessing of the various signals.

The object is also especially achieved in such a way that the measuring signal is formed in a distributed radar system which consists of at least two radar units whose sources are not coherent with respect to each other, that the phase of the signals thus formed is in a proportional relationship to the signal propagation delay of the measuring signals exchanged between the radar units, which is otherwise only the case in coherent radar units. Novel powerful distributed radar systems with several non-coherent transmitting-receiving units are enabled by the preferred methods and arrangements, which are suitable both for detecting and imaging passively reflecting objects and also for detecting other non-coherent transmitting-receiving units. SA methods can also especially be applied in these distributed radar systems with several non-coherent transmitting-receiving units.

This represents a decisive improvement because, as mentioned above, SA methods actually require coherent transmitting-receiving units. It is especially possible as a result of the preferred methods to produce large synthetic apertures with several spatially distributed transmitting-receiving units without having to supply the several units with a common coherent high-frequency reference signal, as is otherwise necessary. By avoiding the high-frequency lines for distributing the high-frequency reference signal, costs are reduced and the complexity of such arrangements decreases considerably.

The precision of position, movement and velocity measurements is increased in the area of secondary radar by the arrangement because coherent signals are now present.

Embodiments will be explained below in closer detail by reference to the drawings. The same reference numerals are used in the different drawings for the same or similarly acting method steps, signals, components and the like, so that reference is also made in this respect to explanations made in respect of other drawings. In particular, differences in relation to the explanations made with respect to other drawings, especially the ones above, are described in a preferably preferred manner, wherein:

FIG. 1 schematically shows the configuration of two non-coherent transmitting-receiving units and their interactions and signal processing;

FIG. 2 schematically shows the configuration of two non-coherent transmitting-receiving units and their interactions and signal processing when using CW radar signals (CW: continuous wave);

Figure 1:
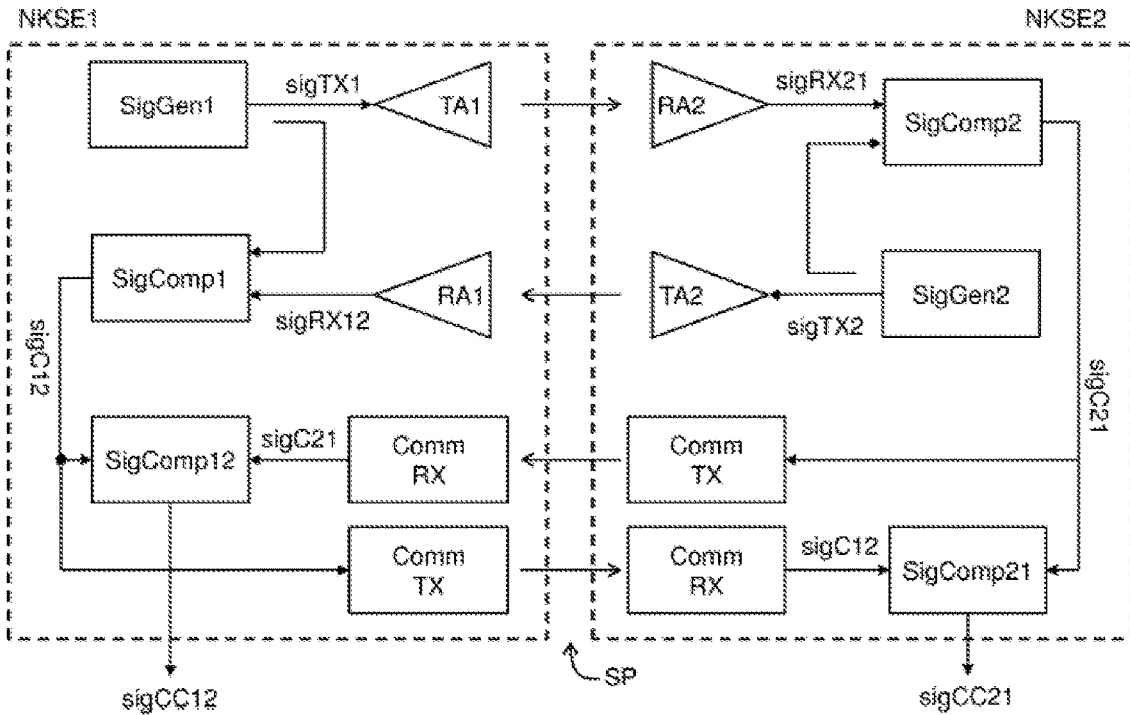

FIG. 1 schematically shows a configuration of two non-coherent transmitting-receiving units NKSE1, NKSE2 and their preferred interactions and signal processing as components of a distributed radar system so as to illustrate an exemplary, preferred basic configuration. A transmitting-receiving unit NKSE1, NKSE2 shall always be regarded below as a non-coherent transmitting-receiving unit NKSE1, NKSE2.

The two transmitting-receiving units NKSE1, NKSE2 are especially arranged to be spatially separate from each other. The transmitting-receiving units NKSE1, NKSE2 exchange signals among each other, which also includes signals with information or data contained therein, via a path SP, which is especially formed as an air interface. Indirectly transmitted signals, which were subject to a reflection on an object along the path SP, are also received in one of the transmitting-receiving units NKSE1, NKSE2 in addition to signals transmitted directly by the other transmitting-receiving units NKSE2, NKSE1.

For an application of a preferred method, a preferred arrangement consists of at least two similarly arranged transmitting-receiving units NKSE1, NKSE2.

In a first one of the at least two transmitting-receiving units NKSE1, NKSE2, a signal generator SigGen1 generates a first signal sigTX1. Said first signal sigTX1 is then divided into two paths via a signal splitter. The first signal sigTX1 is transmitted from the first transmitting-receiving unit NKSE1 via one of the paths via an antenna TA1 formed as a transmitting antenna. The first signal sigTX1 is supplied to a signal comparison unit SigComp1 via the other path. The signal generator especially uses a clock source or an oscillator signal.

The second or a further of the at least two transmitting-receiving units NKSE2 receives the signal transmitted by the first transmitting-receiving unit NKSE1 via an antenna RA2 which is formed as a receiving antenna and conducts said signal as a first receiving signal sigRX21 to a signal comparison unit SigComp2. In said second or further transmitting-receiving unit NKSE2, a signal generator SigGen2 generates a further first signal sigTX2. Said further first signal sigTX2 is also split up, especially via a signal splitter, and supplied to the signal comparison unit SigComp2 on a path. The further first signal sigTX2 is transmitted via a second path via an antenna TA2 formed as a transmitting antenna.

The first transmitting-receiving unit NKSE1 receives the signal emitted by the second or further transmitting-receiving unit NKSE2 via an antenna RA1 formed as a receiving antenna and supplies it, as a first receiving signal sigRX12, to the signal comparison unit SigComp1 of the first transmitting-receiving unit NKSE1.

According to one variant, the respective first signal sigTX1, sigTX2 can be decoupled for example via a directional coupler from the path between the signal generator SigGen1, SigGen2 and the antenna TA1, TA2. It is also possible to transmit the first signal sigTX1, sigTX2 via the antenna TA1, TA2 which is switched as a transmitting antenna and to receive it via the further antenna RA1, RA2 which is switched as a receiving antenna and to apply said signal to the signal comparison unit SigComp1, SigComp2. It is further possible to transmit the first signal sigTX1, sigTX2 via the antenna TA1, TA2 which is switched as a transmitting antenna and to receive said signal via the same antenna which is additionally switched as a receiving antenna on the same path, to decouple it and to apply it to the signal comparison unit SigComp1, SigComp2.

Frequency-modulated signals are preferably used as such first signals sigTX1 and sigTX2. Preferred forms of signal and/or modulation are especially linear frequency modulated signals (FMCW: frequency modulated continuous wave), stepped frequency modulated signals (FSCW: frequency stepped continuous wave), or frequency shift keyed signals (FSK: frequency shift keying) or signals with frequency hops (FHOP: frequency hop) or signals in the orthogonal frequency division multiplexing method (OFDM: orthogonal frequency-division multiplexing). It is also possible to use all other signal forms with so-called good correlation properties as are generally known in radar technology such as noise signals, pseudo-random pulse sequences with amplitudes or phase modulation such as Barker, M, Gold or Kasami sequences, or polyphasic codes. It is especially advantageous for the simultaneous operation of several transmitting-receiving units NKSE1, NKSE2 if for the purpose of multiplexing several transmitting-receiving units NKSE-N with a number N of the transmitting-receiving units NKSE-N with N>1 signal forms are selected with which a set of N orthogonally modulated signals sigTX1, sigTX2, . . . sigTXN can be formed. As a result, every first signal sigTX1, sigTX2, . . . formed in this manner in one of the transmitting-receiving units NKSE1, NKSE2, . . . NKSE-N can be separated even during simultaneous reception of first received signals thus formed in the other of the transmitting-receiving units NKSE1, NKSE2, . . . NKSE-N. In particular, the number N can especially also be greater than two.

The signal comparison units SigComp1, SigComp2 compare the first signal sigTX1 and sigTX2 applied thereto and the first receiving signal sigRX12 and sigRX21, and each form an especially first comparison signal sigC12 and sigC21. In respect of these comparison signals sigC12, sigC21, their phase and/or time progression is predetermined by the time, frequency and/or phase difference of the respective first signals sigTX1 and sigTX2 and the respective first receiving signals sigRX12 and sigRX21 and are determined optionally. Especially with respect to the comparison signal sigC12 of the first transmitting-receiving unit NKSE1, its phase and/or time progression is and can be determined by the time, frequency and/or phase difference of the first signal sigTX1 and the first receiving signal sigRX12 in the first transmitting-receiving unit NKSE1, and with respect to the comparison signal sigC21 of the second of further transmitting-receiving unit NKSE2, its phase and/or time progression is and can be determined by the time, frequency and/or phase difference of the first signal sigTX2 and the first receiving signal sigRX21 in the second transmitting-receiving unit NKSE2.

Such signal comparison units SigComp1 and SigComp2 preferably comprise a so-called mixer when using frequency-modulated signals or a correlator when using phase- and amplitude-modulated or pulsed signals for forming the comparison signal sigC12 and sigC21. The two respectively applied signals are multiplied entirely or in sections in the mixer or correlated entirely or in sections in the correlator. The combined use of mixer and correlator can also be implemented.

The comparison signal sigC21 of the second or further transmitting-receiving unit NKSE2 is transmitted via a data interface CommTX, CommRX of the second transmitting-receiving unit NKSE2 to a data interface CommTX, CommRX of the first transmitting-receiving unit NKSE1 and supplied in the first transmitting-receiving unit NKSE1 to a further signal comparison unit sigComp12. The comparison signal sigC21 is preferably digitised and then transmitted via interfaces formed as digital interfaces. The interface between the data interfaces CommTX, CommRX can be formed in a wireless manner as a radio interface, especially via the path SP therebetween, or in a line-bound or wired manner. The further signal comparison unit SigComp12 in the first transmitting-receiving unit NKSE1 is supplied as a further signal with the comparison signal sigC12 formed in the first transmitting-receiving unit NKSE1.

The further signal comparison unit SigComp12 compares the comparison signals sigC12 and sigC21 which are applied thereto, and forms a comparison-comparison signal sigCC12. In particular, its phase or its amplitude and/or phase progression is determined or optionally determined by the signal propagation delay which is required by a signal for the path from the first transmitting-receiving unit NKSE1 to the second and/or further transmitting-receiving unit NKSE2, or from the second and/or further transmitting-receiving unit NKSE2 to the first transmitting-receiving unit NKSE1. The further signal comparison unit SigComp12 preferably comprises for this purpose a mixer and/or a correlator for forming the comparison-comparison signal sigCC12. The comparison signal sigC12 is supplied to the further signal comparison unit SigComp12 in a preferably digitised manner and the signal comparison is preferably carried out by means of digital signal processing.

The comparison-comparison signal sigCC21 is thus especially formed in such a way that in a first step and in the first transmitting-receiving unit NKSE1 a comparison signal sigC12 is formed from a first signal sigTX1 formed by it and from a first signal sigTX2 which is generated in the second or further transmitting-receiving unit NKSE2 and is transmitted via the path SP, and subsequently in a second step the comparison-comparison signal sigCC21 is formed from said first comparison signal sigC21 and a further first comparison signal sigC21, wherein previously the further first comparison signal sigC21 is formed in the respective manner in the other transmitting-receiving unit NKSE2 from its first signal sigTX2 and the first signal sigTX1 from the first transmitting-receiving unit NKSE1 received therein via the path SP and is transmitted especially as a data signal.

It is especially irrelevant at first whether the signal sigTX1 emitted by the antenna TA1 of the one transmitting-receiving unit NKSE1 reaches the antenna RA2 switched as a receiving antenna directly or reflected via an object to the antenna RA2, which is switched as a receiving antenna, of the other transmitting-receiving unit NKSE2. The transmission path from the one antenna TA1 to the other antenna RA2 can be described, as conventionally used in the system theory, by a channel transmission function or the so-called channel impulse response. It is especially exploited in the method described here that the signal sigTX2 emitted by the antenna TA2 used for transmission is transmitted via the same channel to the antenna RA1 as previously in the reverse direction from the antenna TA1 used for transmission of the one transmitting-receiving unit NKSE1 to the antenna RA2 used for receiving of the other transmitting-receiving unit NKSE2. The generally known technical term for the especially demanded uniformity of the channel transmission function in both transmission directions is the so-called channel reciprocity. The person skilled in the art knows that channel reciprocity can be assumed when the antennas TA1 and RA1 are situated at the same location or only one antenna is used for transmitting and receiving in the one transmitting-receiving unit NKSE1 and furthermore the antennas TA2 and RA2 of the other transmitting-receiving unit NKSE2 are at the same location or only one antenna is used for transmitting and receiving in the other transmitting-receiving unit NKSE2. An especially still sufficient approximate channel reciprocity can still be assumed when both the antennas TA1, RA1 of the one transmitting-receiving unit NKSE1 and also the antennas TA2, RA2 of the at least one other transmitting-receiving unit NKSE2 are arranged very close to each other. Very close to each other shall be understood in that the spatial sampling theorem is maintained, i.e. the distance for antennas with an opening angle of 180° is half the wavelength or one wavelength at a distance of 90°.

A comparison-comparison signal sigCC21 can be formed in a respective manner in the at least one other transmitting-receiving unit NKSE2, similar to the way the comparison-comparison signal sigCC12 was formed in the transmitting-receiving unit NKSE1. In the case of channel reciprocity, the information which can be extracted from the comparison-comparison signals sigCC21 and sigCC12 are identical however. That is why it is usually sufficient to form only one of the two comparison-comparison signals.

By providing a respective procedure, the comparison signal sigC12 of the first transmitting-receiving unit NKSE1 can optionally additionally be transmitted by the or one data interface CommTX, CommRX of the first transmitting-receiving unit NKSE1 to the or one data interface CommTX, CommRX of the second and/or further transmitting-receiving unit NKSE2 and applied to a further signal comparison unit SigComp21 of said second and/or further transmitting-receiving unit NKSE2. The further signal comparison unit SigComp21 in the second and/or further transmitting-receiving unit NKSE2 is supplied as a further signal with the comparison signal sigC21 which is formed in said transmitting-receiving unit NKSE2. A comparison-comparison signal sigCC21 is thus also formed with the further signal comparison unit SigComp21.

Figure 2:
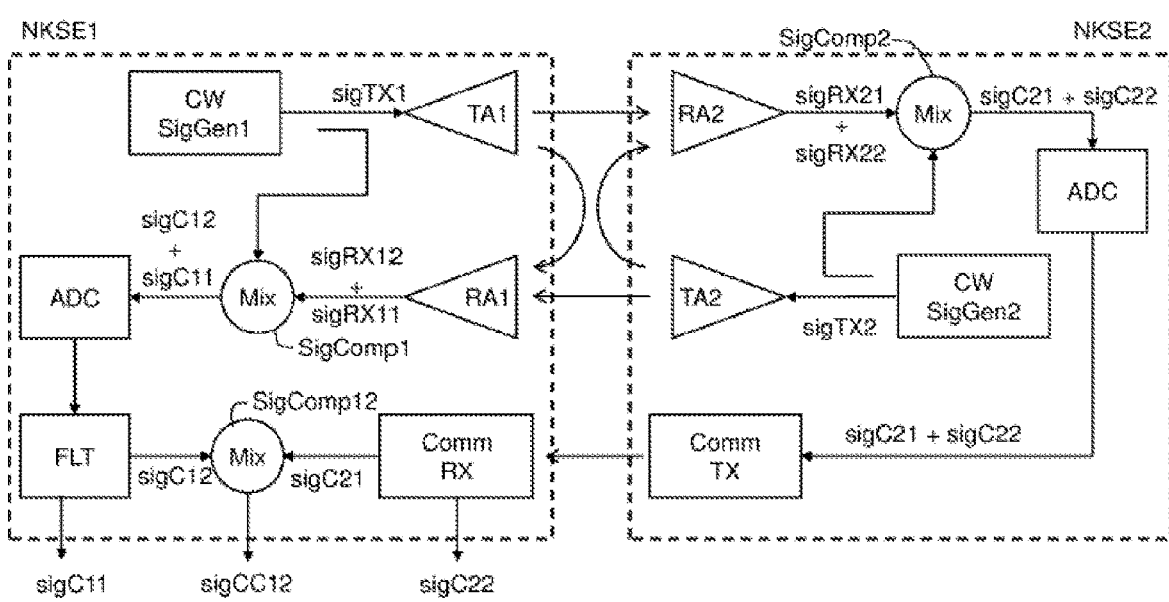

A basic function and a basic structure of a suitable non-coherent transmitting-receiving unit are now explained by way of example by reference to an exemplary embodiment which is shown in FIG. 2.

For reasons of a simple mathematical illustration, the signal generators are assumed at first as being sinus signal generators. The generated CW signals (CW=continuous wave) are each represented mathematically as a complex-valued sinusoidal continuous-wave signal with a fixed angular frequency $\omega_1$ or $\omega_2$ of the exemplary transmitting-receiving units NKSE1, NKSE2. A continuous-wave signal is especially a signal which is emitted continuously with constant frequency within a time period. A transmission of this signal representation on real-valued signals is known as such. The first signals sigTX1, sigTX2 of the two transmitting-receiving units NKSE1, NKSE2, which are assumed as CW transmission signals, are defined dependent on the time t as follows:

$$sigTX1 = e^{j(\omega_1(t-T_{01})+\varphi_1)} \text{ and } sigTX2 = e^{j(\omega_2(t-T_{02})+\varphi_2)}$$

The start times of the signals sigTX1, sigTX2 are T01 and T02 and phases $\varphi_1$ and $\varphi_2$ are random zero phase angles, i.e. angles at the time t=0. In the case of time-limited signals, the start times of the signals are preferably selected in such a way that the two signals sigTX1, sigTX2 relevantly overlap each other. If T is a duration of the two signals sigTX1, sigTX2 and $\Delta T12$ is an amount of the difference of the start times T01 and T02, it is preferably demanded that the duration T is much greater than the amount of the difference $\Delta T12$, advantageously at least 10 times as large. If this is not the case, the transmitting-receiving units NKSE1, NKSE2 are provided with devices which are formed to store the transmitting and receiving signals sigTX1, sigTX2, sigRX21, sigRX12 in order to compare them off-line after signal transmission.

The one of the transmitting-receiving units NKSE1 transmits the first signal sigTX1. Said signal is transmitted on the one hand to the at least one other of the transmitting-receiving units NKSE2 and is received there as the signal sigRX21. On the other hand, the transmitted signal can also return back to the transmitting-receiving unit NKSE1 reflected on an object, which transmitting-receiving unit NKSE1 has transmitted said transmitted signal, and is received there as the signal sigRX11. Consequently, the following applies to the as yet not down-converted signal:

$$sigRX21 = e^{j(\omega_1(t-T_{01}-\tau_{12})+\varphi_1+\varphi_{12})} \text{ and}$$

$$sigRX11 = e^{j(\omega_1(t-T_{01}-\tau_{11})+\varphi_1+\varphi_{12})},$$

wherein $\tau_{12}$ represents a propagation time of the signal from the one, especially the first, of the transmitting-receiving units NKSE1 to the other, especially the second, of the transmitting-receiving units NKSE2 and $\tau_{11}$ represents a propagation time of the signal from the one, especially the first, of the transmitting-receiving units NKSE1 to an object and back to itself. All constant systemic and reflection-induced phase shifts which may occur are considered by the phases $\varphi_1$ and $\varphi_2$.

The other transmitting-receiving unit NKSE2 transmits its signal sigTX2. This signal is transmitted on the one hand especially to the first one of the transmitting-receiving units NKSE1 and is received there as the signal sigRX12. On the other hand, the signal can also be reflected on objects and reach back to the other transmitting-receiving unit NKSE2 which transmits said signal and is received there as the signal sigRX22. The following consequently applies:

$$sigRX12 = e^{j(\omega_2(t-T_{02}-\tau_{21})+\varphi_2+\varphi_{21})} \text{ and}$$

$$sigRX22 = e^{j(\omega_2(t-T_{02}-\tau_{22})+\varphi_2+\varphi_{22})},$$

wherein $\tau_{21}$ represents a propagation time of the signal from the other, especially the second, of the transmitting-receiving units NKSE2 to the one, especially the first, of the transmitting-receiving units NKSE1 and $\tau_{22}$ represents a propagation time of the signal from the other transmitting-receiving unit NKSE2 to an object and back again. The propagation times $\tau_{21}$ and $\tau_{12}$ are equal in the case of channel reciprocity, which is assumed below. All constant systemic and reflection-induced phase shifts which may occur are considered by the phase values $\varphi_{21}$ and $\varphi_{22}$. The phases $\varphi_1$ and $\varphi_2$ are equal in the case of channel reciprocity, which is assumed below for reasons of simplification.

The signal comparison units SigComp1, SigComp 2 are formed in the embodiment as the mixer Mix. They are used to down-convert the received signals sigRX21, sigRX11 and sigRX12, sigRX22 each to a low-frequency frequency band. It is generally known that a mixing process can be expressed by way of system theory as a multiplication or down-converting in the case of two complex sinusoidal signals as a multiplication one of the signals with the conjugated complex one (*=sign for conjugation) of the other signal. The following therefore applies:

$$sigC12 = sigTX1 \cdot sigRX12^* = e^{j(\omega_1(t-T_{01})+\varphi_1)} \cdot$$
$$e^{-j(\omega_2(t-T_{02}-\tau_{21})+\varphi_2+\varphi_{21})}$$
$$= e^{j(\omega_1(t-T_{01})-\omega_2(t-T_{02}-\tau_{12})+\varphi_1-\varphi_2-\varphi_{21})},$$

$$sigC11 = sigTX1 \cdot sigRX11^*$$
$$= \cdot e^{j(\omega_1(t-T_{01})+\varphi_1)} \cdot e^{-j(\omega_1(t-T_{01}-\tau_{11})+\varphi_1+\varphi_{11})}$$
$$= e^{j(\omega_1\tau_{11}+\varphi_{11})},$$

as well as:

$$sigC21 = sigTX2 \cdot sigRX21^*$$
$$= e^{j(\omega_2(t-T_{02})+\varphi_2)} \cdot e^{-j(\omega_1(t-T_{01}-\tau_{12})+\varphi_1+\varphi_{12})}$$
$$= e^{j(\omega_2(t-T_{02})-\omega_1(t-T_{01}-\tau_{12})+\varphi_2-\varphi_1-\varphi_{12})}$$

$$sigC22 = sigTX2 \cdot sigRX22^*$$
$$= \cdot e^{j(\omega_2(t-T_{02})+\varphi_2)} \cdot e^{-j(\omega_2(t-T_{02}-\tau_{22})+\varphi_2+\varphi_{22})}$$
$$= e^{j(\omega_2 \tau_{22}+\varphi_{22})}$$

In the signal comparison unit SigComp1 of the first transmitting-receiving unit NKSE1, the comparison signal sigC12 is formed from the signal sigTX1 of the first transmitting-receiving unit NKSE1 and the signal sigRX12 received therein from the other transmitting-receiving unit NKSE2, and a comparison signal sigC11 is formed from the signal sigTX1 of the first transmitting-receiving unit NKSE1 and the back-reflected signal sigRX11 received therein. In the signal comparison unit SigComp2 of the other, especially the second, transmitting-receiving unit NKSE2, the comparison signal sigC21 is formed from the signal sigTX2 of said transmitting-receiving unit NKSE2 and the signal sigRX21 received therein from the other, first transmitting-receiving unit NKSE1, and a comparison signal sigC22 is formed from the signal sigTX2 of the second transmitting-receiving unit NKSE2 and the back-reflected signal sigRX22 received therein.

In order to ensure that the comparison signals sigC12 and sigC11 as well as the comparison signals sigC21 and sigC22 can be separated easily from each other, i.e. multiplex operation is especially enabled, the angular frequency $\omega_1$ of the one transmitting-receiving unit NKSE1 is selected to be different from the frequency $\omega_2$ of the other transmitting-receiving unit NKSE2. A frequency offset $|\Delta_{12}|=|\omega_1-\omega_2|$ should preferably be selected greater than zero but not too large. The latter is useful in order to avoid unnecessarily increasing a bandwidth of the comparison signal especially for components such as an analog-to-digital converter ADC, a filter FLT, the further signal comparison unit SigComp12 and the data interfaces CommTX, CommRX. In particular, the frequency offset $|\Delta_{12}|$ should be less than currently 20 MHz for example as the conventional operating frequency. The bandwidth of the down-converted comparison signal corresponds to the frequencies contained in the signal, especially the range from zero up to the highest frequency contained in the comparison signal.

Such analog-to-digital converters ADC are especially connected in outgoing circuit to the signal comparison units SigComp1, SigComp2. Depending on the configuration, the analog-to-digital converters ADC are especially provided in outgoing circuit with such a filter FLT or the data interfaces CommTX, CommRX. Such a filter FLT is especially connected in incoming circuit to the further signal comparison unit SigComp12. The further signal comparison unit SigComp12 is formed as a mixer MIX again for example.

The further signal comparison unit SigComp12, which is switched between the filter FLT and the receiving data interface CommRX, is supplied by the filter FLT with the comparison signal sigC12, which is formed from the signal sigTX1 generated in this transmitting-receiving unit NKSE1 and the signal sigRX12 which is received by the other transmitting-receiving unit NKSE2 via the path SP. Furthermore, the signal sigC21 transmitted by the other transmitting-receiving unit NKSE2 is applied by the data interface CommRX to the further signal comparison unit SigComp12.

The filter FLT optionally provides the comparison signal sigC11, which was produced by back-reflection, for further processing. The data interface CommRX optionally provides the co-transmitted comparison signal sigC22 for further processing, which comparisons signal was produced by back-reflection in the other transmitting-receiving unit NKSE2 and was co-transmitted.

If more than two non-coherent transmitting-receiving units NKSEi with I=1, 2, . . . N are used, the signals of all transmitting-receiving units NKSEi are especially operated in multiplex operation. In the illustrated embodiment, it would apply in a third non-coherent transmitting-receiving unit for the respective frequency offset for example that $|\Delta_{12}|\neq|\Delta_{13}|\neq|\Delta_{23}|$ and $|\Delta_{12}|\neq 0$, $|\Delta_{13}|\neq 0$, $|\Delta_{23}|\neq 0$.

If complex modulated signals, i.e. FMCW, FSK, FSCW or OFDM signals, are used as signals sigTX1 and sigTX2 generated by the transmitting-receiving units, said signals sigTX1 and sigTX2 will be or are preferably modulated in such a way that they can be multiplexed, i.e. all transmitted signals which are generated by the transmitting-receiving units are separated after receipt in a transmitting-receiving unit and can be associated with the respective transmitting-receiving unit which has transmitted a signal. Conventional code, frequency and time-multiplex methods can be applied for signal separation.

The comparison signals sigC11, sigC22, which were produced from signals generated, transmitted and reflected back by one of the transmitting-receiving units, represent conventional CW radar signals when especially considered individually, or conventional FMCW radar signals, when especially considered individually, when using FMCW modulated transmission signals. The components and their arrangement for gaining said comparison signals sigC11, sigC22 especially correspond to conventional CW radar, when especially considered individually. Therefore it is known how CW radar systems are structured and how CW radar signals are processed and how the distance and the speed in relation to several targets can be determined via FMCW, FSK, FHOP or OFDM radar methods when using several signal frequencies.

Especially both comparison signals sigC22, sigC21 of the first signal comparison unit SigComp2 in the especially second transmitting-receiving unit NKSE2 are transmitted via the interfaces CommTX, CommRX to the especially first transmitting-receiving unit NKSE1 and are further processed there. It is optionally also possible to similarly transmit the respective two comparison signals sigC11, sigC12, which are formed in the especially first transmitting-receiving unit NKSE1, to the other, especially second, transmitting-receiving unit NKSE2 and to process there. For the reasons of clarity of the illustration, this option and the components necessary for this purpose are not shown in the embodiment.

As explained above, it is an especially preferred approach to supply the thus transmitted comparison signals sigC21 and sigC12 to at least one further signal comparison unit SigComp12. In the respective example, the further signal comparison unit SigComp12 in the especially first transmitting-receiving unit NKSE1 is especially formed as a mixer which processes, especially multiplies, the comparison signal sigC21 which was received by means of transmission and the comparison signal sigC12 which was formed in said transmitting-receiving unit NKSE1. The following is obtained as comparison-comparison result, especially the mixing result, by using the phase values $\varphi_{12}=\varphi_{21}$:

$$sigCC12 = sigC12 \cdot sigC21$$

$$= e^{j(\omega_1(t-T_{01})-\omega_2(t-T_{02}-\tau_{12})+\varphi_1-\varphi_2-\varphi_{21})} \cdot$$

$$e^{j(\omega_2(t-T_{02})-\omega_1(t-T_{01}-\tau_{12})+\varphi_2-\varphi_1-\varphi_{12})}$$

$$\Rightarrow sigCC12 = e^{-j((\omega_1+\omega_2)\tau_{12}-2\varphi_{12})}$$

As is shown in the equation, this comparison-comparison signal sigCC12 now also formally corresponds after the second comparison process to a signal of a CW radar system which is generally conventional, because the phase of the signal is proportional to the propagation time τ12 of the signal. As a result of the mutual measurement and the further signal comparison, it is managed to especially compensate all unknown components of the initially incoherent signals. A radar signal is thus produced as in a coherent radar system, even if the two non-coherent transmitting-receiving units NKSE1, NKSE2 are used for the measurement.

Since the comparison-comparison signal sigCC12 also formally corresponds to a conventional CW radar signal, the generally known FMCW, FSK, FHOP or OFDM radar methods can thus also be applied when using several signal frequencies in order to determine a distance between the two non-coherent transmitting-receiving units NKSE1, NKSE2 and a relative velocity between them. FMCW, FSK, FHOP or OFDM radar methods are known in the field of radar technology and can be applied to the transmitted first signals sigTX1, sigTX2.

If the transmitting-receiving units NKSE1, NKSE2 are at an unknown distance from each other or if they move with an unknown relative velocity with respect to each other, it is possible, as explained above, to determine the distance and the velocity of the transmitting-receiving units with respect to each other via the evaluation of the comparison-comparison signal sigCC12 which is determined at several frequencies, in so far as the signals between the transmitting-receiving units are exchanged directly via a visual connection.

Figure 3:
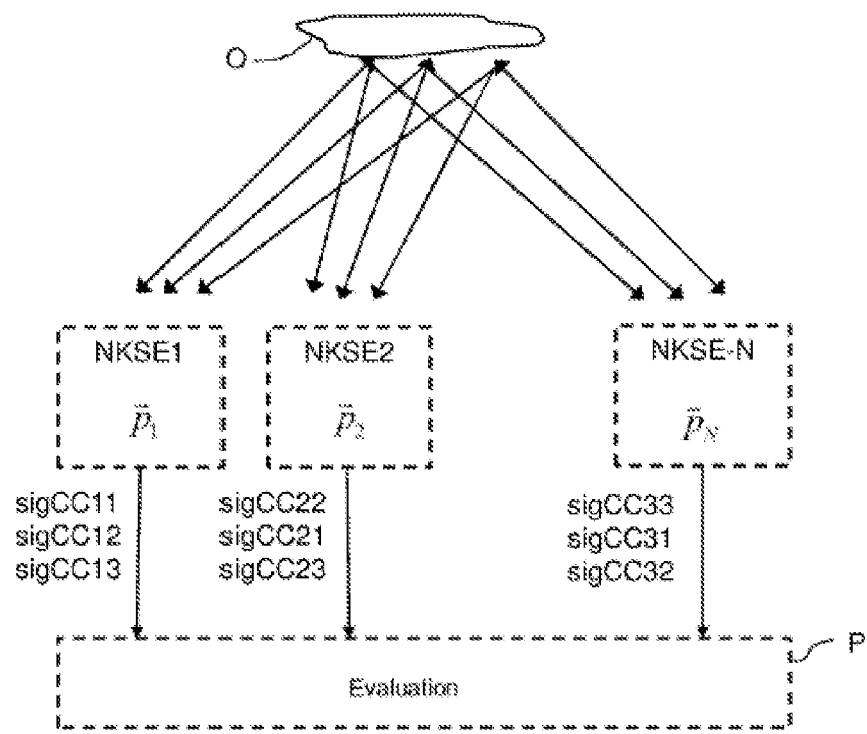
FIG. 3 shows an arrangement of several such non-coherent transmitting-receiving units concerning a MIMO arrangement for measuring passively reflecting objects for detecting an object or imaging an object scene.

FIG. 3 shows a possible arrangement of several non-coherent transmitting-receiving units NKSE1, NKSE2, . . . NKSE-N in a measuring situation for detecting or imaging an object O. The transmitting-receiving units NKSE1, NKSE2, . . . NKSE-N each have a known position $\vec{p}_1$, $\vec{p}_2$, . . . $\vec{p}_N$. An especially common evaluation device P is especially supplied with comparison-comparison signals sigC11, sigC12, sigC13, sigC22, sigC21, sigC23, . . . , sigC33, sigC31, sigC32, for further processing from the transmitting-receiving units NKSE1, NKSE2, . . . NKSE-N. The comparison-comparison signals sigC11, sigC12, sigC13, sigC22, sigC21, sigC23, . . . , sigC33, sigC31, sigC32 cover the combination of more than two of the transmitting-receiving units NKSE1, NKSE2, NKSE-N, especially all possible combinations of all of the transmitting-receiving units NKSE1, NKSE2, NKSE-N which are obtained by such an arrangement.

If the transmitting-receiving units NKSE1, NKSE2 are in a constant and known distance from each other and if they jointly irradiate an object O with their transmission signals, a distance or a length of the signal transmission path can be determined in a comparable manner as in the back-reflected comparison signals sigCC11 and sigCC22 according to the previous embodiment, and a relative velocity in relation to the object O can be determined as in the comparison-comparison signal sigCC12.

A respective length of the signal transmission path can therefore be determined by evaluating the two or more comparison signals sigCC11, sigCC22, which are formed as a result of back-reflections, and the comparison-comparison signal sigCC12. In the case of an omnidirectional antenna, the distance values, which are formed from the comparison signals sigC11, sigC22 formed by back-reflections, each provide a circular orbit on which the object O can be located and the comparison-comparison signal sigCC12 supplies a hyperbole. The position of the object O, especially relative to the positions of the transmitting-receiving units NKSE1, NKSE2, can be determined by a multilateration method which is known as such. By using additionally employed further transmitting-receiving units NKSE-N, the detection precision is improved and improved multi-target capability is achieved.

The deviations of the phase values φ11, φ22 and φ12 among each other are usually constant, but not necessarily known. If the deviations of the phase values φ11, φ22 and φ12 among each other are known from a calibration measurement for example, the signals sigCC11, sigC22, which are formed as a result of back-reflections, and the comparison-comparison signal sigCC12 can also be compared with respect to their phases. This allows highly precise angular measurements especially via phase monopoly pulse methods or interferometric methods and the application of so-called reconstructive imaging methods such as the SAR reconstruction methods or broadband holography. Reconstructive methods are also known as such under the terms digital beamforming or diffraction tomography. It is advantageous for reconstruction methods to use a greater number (e.g. N pieces) of transmitting-receiving units. It is advantageous in the application of the currently preferred method that it is not only possible to determine the phase values φ11, φ22, . . . φNN of N unilateral/monostatic measuring parts, as would otherwise be conventionally used in distributed, non-coherently operating radars, but that especially also the phase values φ12, φ13, . . . φ1N, φ23, φ24, . . . φ2N, φN-1N of transverse transmission paths are included in the evaluation, which leads to a drastic increase in the measuring information. In the case of a suitable selection of the antenna positions in so-called sparse arrays, it is possible to achieve good reconstruction results with a relatively low number of transmitting-receiving units.

Figure 4:
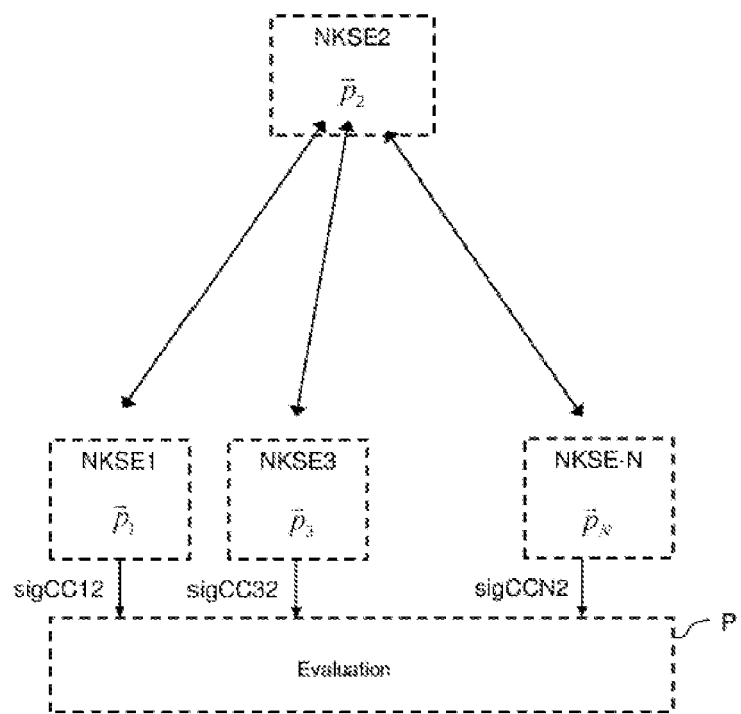
FIG. 4 shows an arrangement of several such non-coherent transmitting-receiving units concerning a MIMO arrangement for the measurement between actively reflecting non-coherent transmitting-receiving units for detecting at least one further non-coherent transmitting-receiving unit.

FIG. 4 shows a possible arrangement of several non-coherent transmitting-receiving units NKSE1, NKSE2, NKSE3, . . . , NKSE-N in connection with a MIMO secondary radar in a measuring situation for detecting at least one further non-coherent transmitting-receiving unit NKSE2. In the example, the N−1 positions $\vec{p}_1$, $\vec{p}_3$, . . . $\vec{p}_N$ of the transmitting-receiving units NKSE1, NKSE3, . . . NKSE-N are known. The position $\vec{p}_2$ of the further or other, especially second, transmitting-receiving unit NKSE2 is assumed to be unknown at first.

As a result of the preferred method, the distance from another of the transmitting-receiving units NKSE1, NKSE3, . . . NKSE-N can be determined from each of the transmitting-receiving units NKSE1, NKSE3, . . . NKSE-N. In the embodiment, the comparison-comparison signal sigCC12, by using the signals sigTX1, sigTX2 generated in the first and the second of these transmitting-receiving units NKSE1, NKSE2, supplies the distance between the first transmitting-receiving unit NKSE1 and the second transmitting-receiving unit NKSE2, and the third transmitting-receiving unit NKSE3 and the $N^{th}$ transmitting-receiving unit NKSE-N each also supply a distance value from the second transmitting-receiving unit NKSE2. The position of the second transmitting-receiving unit NKSE2 can thus be determined by a multilateration method which is known as such. The detection precision is improved even further by using further suitably arranged transmitting-receiving units.

The deviations of the phase values φ12, φ32 to φN2 among each other are usually constant, but not necessarily known. If the deviations of the phase values are known, which can be ensured by calibration, the comparison signals sigC12, sigC32, which are formed on the basis of a signal generated in the transmitting-receiving units NKSE1, NKSE3 and one generated by the other, especially the second, transmitting-receiving unit NKSE2, and the comparison-comparison signal sigCCN2, which is formed on the basis of signals of the $N^{th}$ transmitting-receiving unit NSKE-N and the transmitting-receiving unit NKSE2, are also compared with respect to their phases or phase values φ12, φ32 to φN2. This then allows highly precise angular measurements via phase monopoly pulse methods or interferometric methods as well as the application of so-called reconstructive detection methods such as the SAR reconstruction method or broadband holography. Such a method can also be carried out alternatively in that each transmitting-receiving unit is operated with at least two receiving channels and their transmission signals are used. As a result, the angle of incidence of the signals in the transmitting-receiving unit can occur by the evaluation of the phase differences of the channels.

Suitable SAR methods for detecting a transponder are known from the initially mentioned documents. On the basis of the preferred method as described here and such an arrangement, such methods for detecting a transponder can be used not only for so-called backscatter transponders, which are characterized in that a radar signal is reflected in a modulated manner by a transponder with a coherent carrier phase. A transmission to other transponder systems is now also possible, even if transponders with a separate signal source usually respond in a non-coherent manner. It is now especially possible by the described method to determine a phase value φ12, φ32, . . . , φN2 which is in a proportional relationship to the respective distance between the two mutually interacting incoherent or non-coherent transmitting-receiving units. All detection and reconstruction methods can therefore be applied, as are known for example from the field of primary radar technology and from the field of the detection of backscatter transponders as such. In comparison with backscatter transponder systems, the transponder systems with the non-coherent transmitting-receiving units as described here offer the advantage that their range can be and is especially significantly greater, and more complex multiplex methods can be applied.

Figure 5:
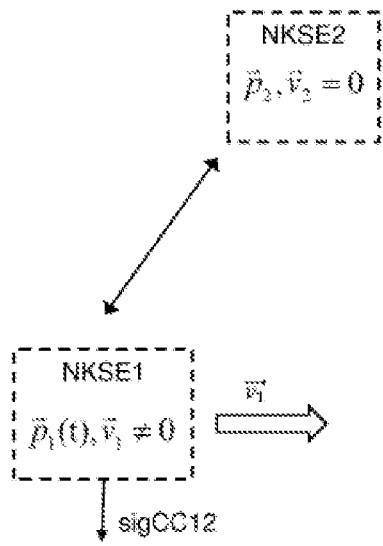
FIG. 5 shows a recording situation for a secondary radar aperture synthesis.

The preferred method can be applied in an especially advantageous manner if during a measurement between two non-coherent transmitting-receiving units NKSE1, NKSE2 at least one of the transmitting-receiving units NKSE1 is moved and a relative movement between the transmitting-receiving units NKSE1, NKSE2 is determined by an assisting sensor system, such as one with an inertial sensor system, an odometer or any other movement-measuring devices. An exemplary SAR measuring situation is shown in FIG. 5 with a recording situation for secondary radar aperture synthesis. Since a signal whose phase is proportional to the distance between the transmitting-receiving units NKSE1, NKSE2 is formed during a measurement between two transmitting-receiving units NKSE1, NKSE2 with the method as described here, the synthetic aperture method (SAR) and the inverse synthetic aperture method (ISAR), which are generally known in radar technology, can consequently be applied.

An especially first transmitting-receiving unit NKSE1 moves at a time t, starting from a position $\vec{p}_1(t)$, with a velocity $\vec{v}_1$ unequal zero along a trajectory and carries out multiple measurements during travel to the other, especially second transmitting-receiving unit NKSE2 according to the method as described here. The second transmitting-receiving unit NKSE2 is located at a position $\vec{p}_2(t)$ with a velocity $\vec{v}_2$ equal zero for example. A comparison-comparison signal sigCC12 of these two transmitting-receiving units NKSE1, NKSE2 is especially used for evaluation. The position of the second transmitting-receiving unit NKSE2 relative to the first transmitting-receiving unit NKSE1 can be determined in a highly precise manner by means of a holographic reconstruction algorithm as is known for example from the initially mentioned documents. The illustrated method and the arrangement are therefore especially suitable for the highly precise detection of vehicles such as motor cars, aeroplanes, railway vehicles, mobile robots, autonomous vehicles etc. The first transmitting-receiving unit NKSE1 is located on the vehicle for example and the further transmitting-receiving units NKSE2 are located at known positions as milestones. If the vehicle moves, the first transmitting-receiving unit NKSE1 can determine its relative position in relation to the other transmitting-receiving units NKSE2 etc according to an SA method and thus determine its own position in the system of coordinates of the milestones.

Figure 6:
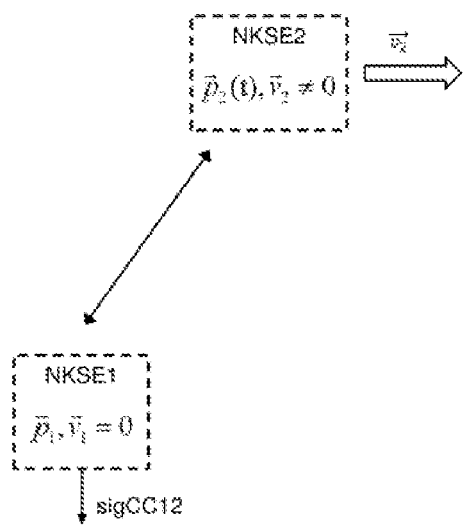
FIG. 6 shows a recording situation for an inverse secondary radar aperture synthesis.

FIG. 6 shows an exemplary measuring situation and recording situation for inverse secondary radar aperture synthesis. An especially second transmitting-receiving unit NKSE2 moves at a time t starting from a position $\vec{p}_2(t)$ with a velocity $\vec{v}_2$ unequal zero along a trajectory and carries out multiple measurements according to the preferred method with at least one further, especially first transmitting-receiving unit NKSE1. The second transmitting-receiving unit NKSE2 further determines the progression of the trajectory via an inertial platform for example and transmits it via radio to the first transmitting-receiving unit NKSE1, which remains especially at a fixed location $\vec{p}_1(t)$ and a velocity $\vec{v}_1$ equal zero. An arrangement consisting of acceleration and angular velocity sensors is understood as the inertial platform, preferably arranged in three axes. A comparison-comparison signal sigCC12 of these two transmitting-receiving units NKSE1, NKSE2 is especially used for evaluation. The position of the second transmitting-receiving unit NKSE2 relative to the first transmitting-receiving unit NKSE1 is determined in an especially highly precise manner by a holographic reconstruction algorithm, as is illustrated as such in the initially mentioned documents for example. The illustrated method and arrangement are therefore especially suitable for detecting mobile objects which were equipped with a transponder with such a non-coherent transmitting-receiving unit, or especially for detecting end effectors of robots equipped in this manner or crane jibs or load receiving means. If several stationary transmitting-receiving units are used for determining the position of a mobile transmitting-receiving unit, the detection method designated in the initially mentioned documents as "multilateral inverse synthetic aperture secondary radar" is used especially advantageously.

The following drawings show potential further embodiments of such non-coherent transmitting-receiving units.

Figure 7:
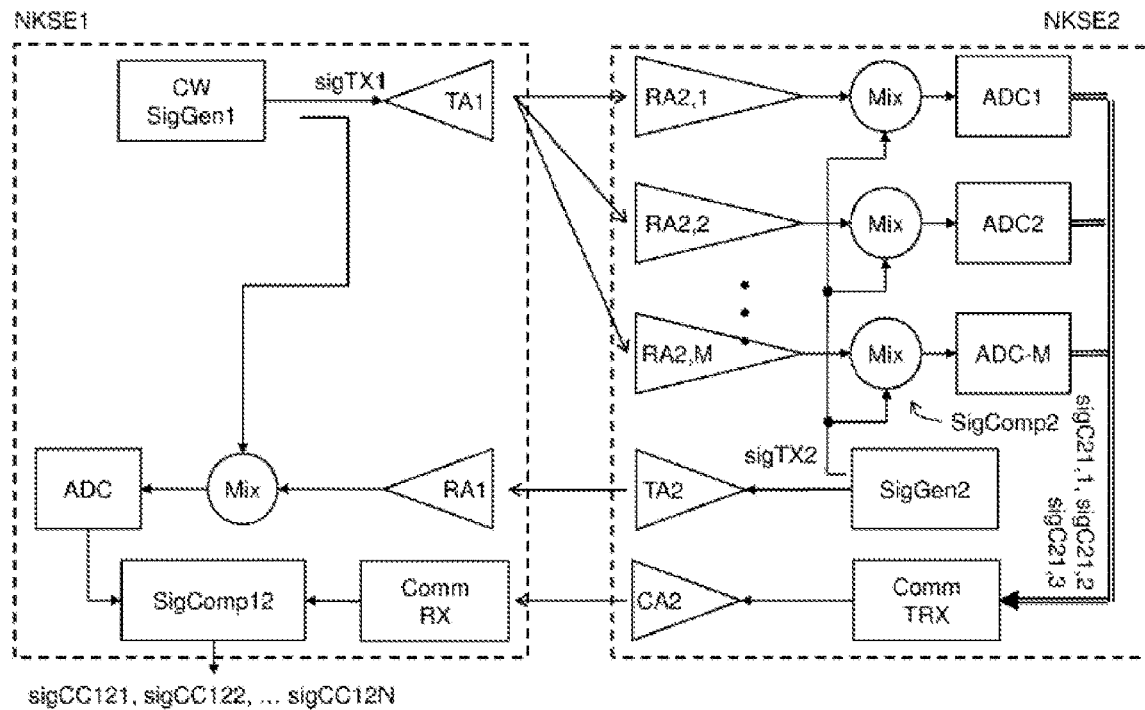
FIG. 7 shows an arrangement for measuring an angle between two non-coherent transmitting-receiving units relative to the second antenna plane.

FIG. 7 shows an arrangement for measuring an angle between two non-coherent transmitting-receiving units NKSE1, NKSE2 relative to an antenna plane with especially a plurality of antennas RA2, 1, RA2, 2, RA2, 3, which are switched to reception. A first one of the transmitting-receiving units NKSE1 is arranged in an especially comparable manner to the first transmitting-receiving unit NKSE1, wherein a filter is not shown or can be avoided entirely. A communication interface CommRX for receiving a signal from another, especially second, transmitting-receiving unit NKSE2 is optionally formed in such a way that it can receive a comparison signal which is also transmitted via an air interface by the second transmitting-receiving unit NKSE2 via an antenna CA2 formed for transmission.

The second transmitting-receiving unit NKSE2 also comprises a signal generator SigGen2 whose generated signal sigTX2 is transmitted via an antenna TA2 and is also decoupled. The multiple, e.g. three, antennas RA2, 1, RA2, 2, RA2, 3, which are switched to reception, each comprise in the second transmitting-receiving unit NKSE2 a signal comparison unit SigComp2 in outgoing circuit which is formed as a mixer for example. The generated signal sigTX2 is additionally applied to said signal comparison units SigComp2 for mixing the receiving signal of the antenna. The mixed signals are each transmitted directly or are especially each applied to an analog-to-digital converter connected in outgoing circuit and applied to the communication interface CommTRX for transmission to the other transmitting-receiving unit NKSE1. Said communication interface CommTRX is equipped by way of example with the antenna CA2 for transmission via the air interface.

Three or more comparison signals sigC21, 1, sigC21, 2, sigC21, 3 are thus transmitted to the first transmitting-receiving unit NKSE1, wherein the comparison signals sigC21, 1, sigC21, 2, sigC21, 3 are each associated with a different receiving location within the second transmitting-receiving unit NKSE. Several comparison-comparison signals sigCC121, sigCC122, . . . , sigCC12N are thus preferably formed in the first transmitting-receiving unit NKSE1, and are provided for evaluation or are evaluated.

It is possible by such use of several coherent coupled receiving antennas in a transmitting-receiving unit NKSE2 to determine not only the distance and velocity between two transmitting-receiving units NKSE1, NKSE2, but also their angles with respect to each other. The manner in which the angle of incidence of a wave can be determined with several coherent receiving channels is generally known. With the arrangement according to FIG. 7, the angle between two transmitting-receiving units NKSE1, NKSE2 relative to the antenna plane of the transmitting-receiving unit NKSE2 is especially also determined with the plurality of antennas RA2, 1, RA2, 2, RA2, 3.

Figure 8:
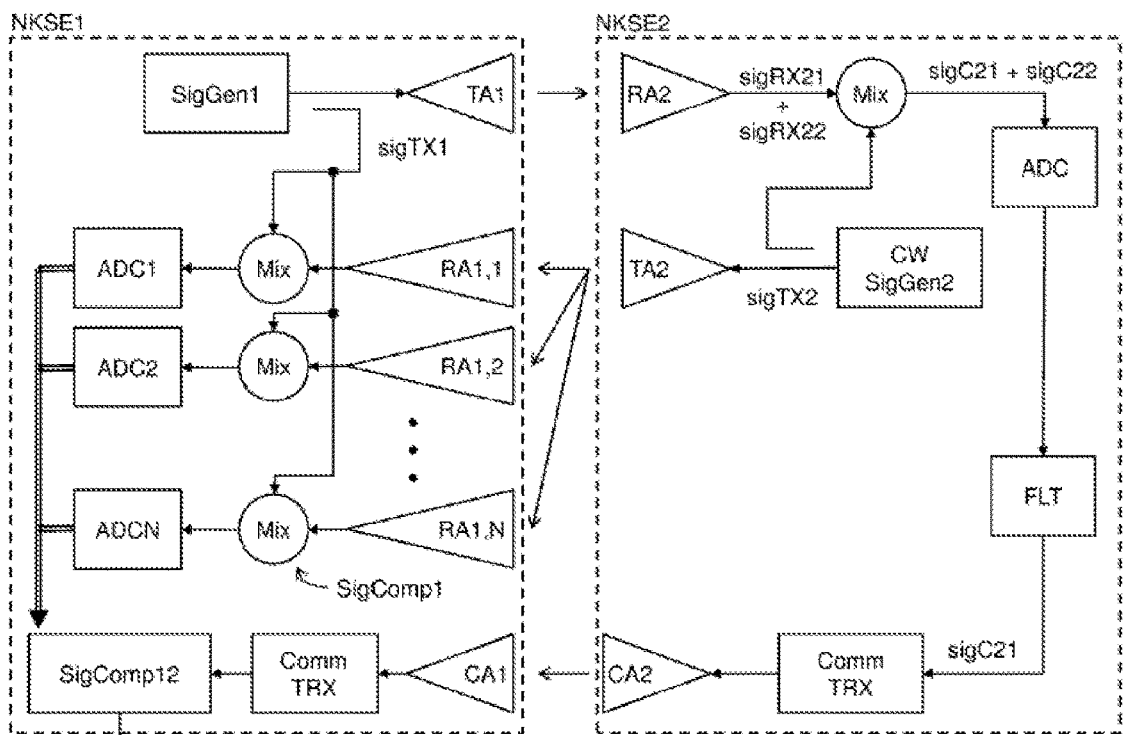
FIG. 8 shows an arrangement for measuring an angle between two non-coherent transmitting-receiving units relative to the first antenna plane.

The angle between two non-coherent transmitting-receiving units NKSE1, NKSE2 relative to an antenna plane of the first transmitting-receiving unit NKSE1 can be determined by an arrangement according to FIG. 8.

With this example, the first of the transmitting-receiving units NKSE1 is configured in an especially comparable manner in relation to the second transmitting-receiving unit NKSE2 of FIG. 7 and is especially equipped with a plurality of antennas RA1, 1, RA1, 2, RA1, 3 which are switched to reception. They are provided in outgoing circuit with an arrangement of the signal comparison units SigComp1, which each comprise a mixer per antenna RA1, 1, RA1, 2, RA1, 3. At least one receiving signal of one of the antennas is applied to said signal comparison units SigComp2 is applied for mixing and in addition the signal sigTX1 which is generated in the first transmitting-receiving unit NKSE1. The signals generated with the mixers are each applied to an analog-to-digital converter ADC1, ADC2 or ADCN which is connected in outgoing circuit, and is applied after conversion or directly to a signal comparison unit SigComp12. A signal or data received via a communication interface CommTRX is further applied to the signal comparison unit SigComp12, which signal or data contain a comparison signal sigC21 received from the second transmitting-receiving unit NKSE2. The signal comparison unit SigComp12 especially generates several comparison-comparison signals sigCC112, sigCC122, . . . , sigCC1N2 which are provided for evaluation or are evaluated.

The communication interface CommTRX is provided by way of example with an antenna CA1 for reception via the air interface. Accordingly, a communication interface CommTRX with an antenna CA2 for transmission via the air interface is provided in the second transmitting-receiving unit NKSE2. The second transmitting-receiving unit NKSE2 is formed in all other respects like the second transmitting-receiving unit NKSE2 of FIG. 2. In further contrast thereto, the second transmitting-receiving unit NKSE2 of FIG. 8 comprises a filter FLT which is switched between the analog-to-digital converter ADC and the communication interface CommTRX and only allows the comparison signal to pass to the communication interface CommTRX which is generated from the comparison of the own generated signal sigTX2 and a signal sigRX21 received from the first transmitting-receiving unit NKSE1.

If several antennas switched for reception are formed according to a further embodiment in both non-coherent transmitting-receiving units, the angle between the transmitting-receiving units and the tilting of the two antenna planes with respect to each other can be determined. It would also be possible alternatively or in addition to use several coherent transmission channels.

Figure 9:
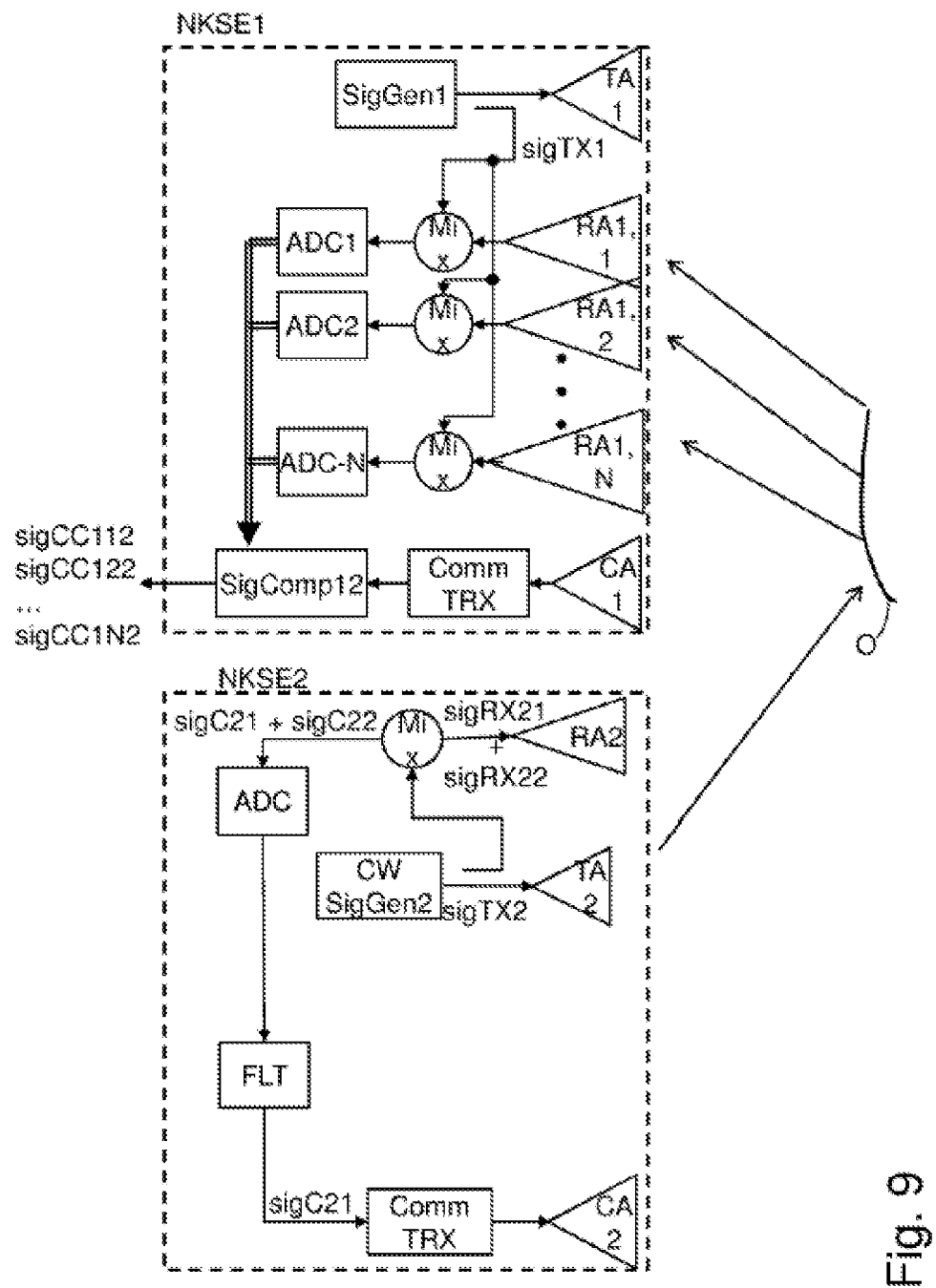
FIG. 9 shows an arrangement for measuring an angle between an object and a first one of two non-coherent transmitting-receiving units or for detecting an object or for imaging an object scene.

Such an arrangement with several non-coherent transmitting-receiving units arranged in parallel is also advantageous for a measurement of objects O as passive radar targets. FIG. 9 thus shows an arrangement by way of example for the measurement with two non-coherent transmitting-receiving units NKSE1, NKSE2 to a non-cooperative target, including angular measurement. The transmitting-receiving units NKSE1, NKSE2 are formed as in FIG. 8, but direct the respectively transmitted first signals sigTX1 and sigTX2 to the object O, from which the signals are reflected to the respective antennas RA1, 1, RA1, 2, . . . RA1, N or RA2. With this arrangement, an angle of incidence can be estimated by the phase differences in addition to the distance according to one of the preceding methods and can be combined with the distance. For the purpose of solving an internal calibration problem, each transmitting-receiving unit can also be equipped with a so-called backscatter with which the receiving channels are calibrated.

Figure 10:
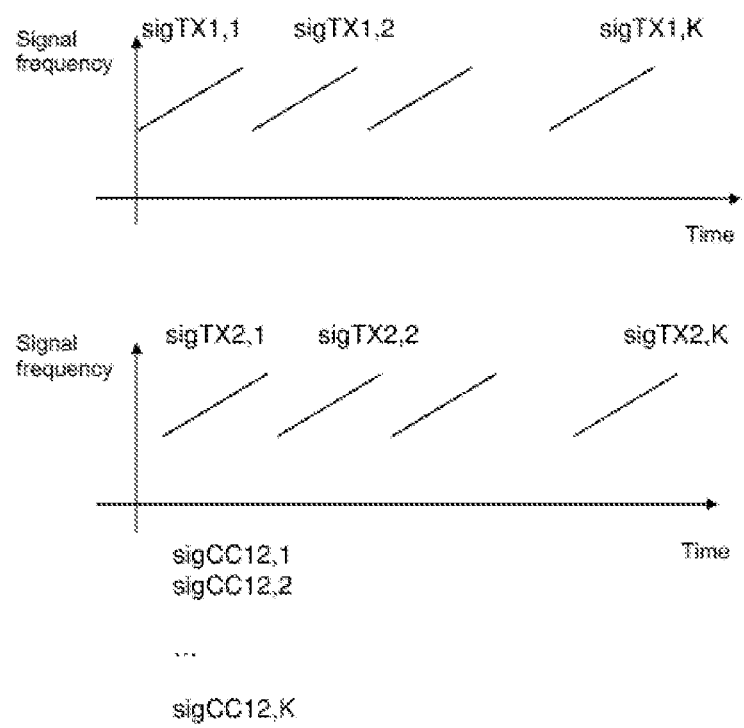
FIG. 10 shows an FMCW multi-ramp signal used by way of example.

It is especially advantageous for measuring the distance and velocity to use so-called multi-ramp FMCW signals as a measuring signal or by the respective signal generator SigGen1, SigGen2 as its signal sigTX1, sigTX2. FIG. 10 shows FMCW multi-ramp signals by way of example which are generated especially as a first signal sigTX1, 1, sigTX1, 2, . . . sigTX2, 1, sigTX2, 2, . . . , sigTX2, K by the signal generator SigGen1, SigGen2 as its signal sigTX1 of the first and other/second transmitting-receiving units NKSE1, NKSE2 of the aforementioned drawings. In these multi-ramp FMCW signals, a number of preferably K similarly FMCW modulated signals sigTX1, 1, sigTX1, 2; . . . sigTX1, K or sigTX2, 1, sigTX2, 2; . . . , sigTX2, K are transmitted in a preferably fixed time interval. For multiplexing purposes, the multi-ramp FMCW signals are transmitted in the transmitting-receiving units involved in the measurement either slightly offset in respect of time or frequency. The term slightly means especially a time delay by not more than 10% of the measurement ramp duration or the equivalent frequency offset in the time-frequency diagram.

An FMCW measuring signal is produced, as described above, in each individual FMCW ramp by the preferred alternating exchange of the signals. A total of K FMCW measuring signals is thus produced. They are now preferably arranged into a matrix as comparison-comparison signal sigCC12,1; sigCC12,2; . . . sigCC12,K. In the case of arrangement of the signals in lines, this data matrix has the following shape for example:

$$sigCC12Mat = \begin{pmatrix} sigCC12, 1 \\ sigCC12, 2 \\ \vdots \\ sigCC12, K \end{pmatrix}$$

If a two-dimensional Fourier transformation is applied to this matrix, a so-called range-Doppler diagram is produced, from which the distance and velocity between the non-coherent transmitting-receiving units can be determined in an especially highly precise manner.

It may be expedient for the better adjustment of the signal generators in the distributed transmitting-receiving units to synchronise the signal sources in the stations or the apparatuses comprising the non-coherent transmitting-receiving units by exchanging radio signals prior to performing the measuring processes described as preferable concerning the frequency/clock rate and time offset, because cheap oscillators may deviate considerably from the nominal value or can drift in the case of changes in temperature. A deviation of the clock generators in the signal sources produces a scaling of all frequency values and durations for example, which can especially distort the signal modulation and the time basis of the digitised signals and could consequently lead to erroneous results in the comparison. A method according to U.S. Pat. No. 8,108,558 B2 "Circuit arrangement and method for synchronization of clocks in a network" or a method according to U.S. Pat. No. 7,940,743 B2 "Method and device for the synchronization of radio stations and a time-synchronous radio bus system" are suitable for example for the synchronisation of the non-coherent transmitting-receiving units. It is especially advantageous for the purpose of synchronising the non-coherent transmitting-receiving units to apply the method from U.S. Pat. No. 7,940,743 B2 to the comparison signals sigC21 and sigC12. It is especially advantageous in this case to exchange at least two FMCW radar signals with at least two sweep rates which differ with respect to amount or sign (sweep rate: change in the signal frequency per time). A preferred embodiment uses at least two FMCW radar signals for this purpose, wherein the frequency increases with time in one of these FMCW signals, which corresponds to a positive sweep rate, and the frequency decreases with time in a further FMCW signal, which corresponds to a negative sweep rate.

In particular, further combinations of alternative different elements of embodiments other than those described above can be realised, which elements are shown in the various drawings.

A preselection of an interesting range of the comparison signals sigC21, sigC12 and a transmission only in this range via the communication device instead of a transmission of a complete comparison signal can be implemented for example as a further embodiment. Accordingly, the term comparison signal also includes an only partial comparison signal as long as it still contains sufficient data content for the determination of a comparison-comparison signal. An index value can optionally additionally be transmitted in such a case, which indicates which range of the comparison signal was transmitted. Furthermore, a transmission of several ranges or sections of such a comparison signal can be realised.

The transmission of the comparison signals can also be implemented in a further embodiment by transmitting the spectrums instead of the actually generated comparison signals and/or by transmitting spectrums in sections. The formation of a spectrum of the two comparison signals or a conjugated complex modification at the spectral level for forming the comparison-comparison signal can also especially be realised.

The invention claimed is:

1. A method for use in a system having spatially-separated non-coherently operating transmitting-receiving units, the method comprising:
   generating a first signal in a first non-coherent transmitting-receiving unit and transmitting the first signal via a path,
   generating a further first signal in a further non-coherent transmitting-receiving unit and transmitting the further first signal via the path,
   in the first transmitting-receiving unit, forming a comparison signal from the first signal and from the further first signal received from the further transmitting-receiving unit via the path, wherein the comparison signal comprises frequency information, phase information and amplitude information indicative of a difference between the first signal and the further first signal received from the further transmitting-receiving unit via the path, and
   in the further transmitting-receiving unit, forming a further comparison signal from the further first signal and from the first signal received from the first transmitting-receiving unit via the path, wherein the further comparison signal comprises frequency information, phase information and amplitude information indicative of a difference between the further first signal and the first signal received from the first transmitting-receiving unit via the path,
   wherein the further comparison signal is transmitted from the further transmitting-receiving unit to the first transmitting-receiving unit, and
   wherein a comparison-comparison signal is formed from said comparison signal and the further comparison signal, the forming the comparison-comparison signal comprising mixing or correlating a representation of the first comparison signal with a representation of the further comparison signal at least in part to compensate for variation between respective non-coherently operating oscillators in the first transmitting-receiving unit and the further transmitting-receiving unit.

2. A method according to claim 1, wherein at least one of the comparison signal or the further comparison signal is transmitted between the transmitting-receiving units as a digital representation; and
   wherein the comparison-comparison signal is formed using the digital representation.

3. A method according to claim 1, wherein at least one of the first signal and the further first signal is transmitted as a transmission signal via the path formed as an air interface.

4. A method according to claim 1, wherein the points in time for transmitting the first signal and the further first signal are coordinated in such a way that the first signal and the further first signal overlap each other temporally at least in part.

5. A method according to claim 1, wherein a signal propagation delay for the path between the transmitting-receiving units is determined from at least one comparison-comparison signal including that at least one of a phase value, a frequency value, an amplitude progression or a phase progression of the comparison-comparison signal is determined.

6. A method according to claim 1, wherein at least one of the first signal or the further first signal is generated and transmitted as an FMCW-modulated or OFDM-modulated signal.

7. A method according to claim 1, wherein at least one of the first signal or the further first signal is generated and transmitted as a multi-ramp signal.

8. A method according to claim 1, wherein several comparison-comparison signals formed from said comparison signal and the further comparison signal are measured over time by means of at least two transmitting-receiving units, of which at least one of the transmitting-receiving units moves over time, and at least one of a distance, a position, a velocity or a presence of one of the transmitting-receiving units or the presence of one such transmitting-receiving unit, or at least one of a distance, a position, a velocity of the one such transmitting-receiving unit relative to an object or a presence of the object is determined by a synthetic aperture method.

9. A method according to claim 1, further including forming still further signals from back-reflections and the comparison-comparison signal, and comparing the still further signals with respect to their phases.

10. A method according to claim 9, further including using the comparison of the phases to determine an angle.

11. A method according to claim 9, wherein using the comparison of the phase to determine an angle includes using a phase monopulse method or an interferometric method, or an SAR reconstruction method, or a broadband holography method.

12. A method according to claim 1, wherein the comparison signals which are formed on the basis of a signal generated in a transmitting-receiving unit and one generated by another transmitting-receiving unit, and the comparison-comparison signal, which is formed on the basis of signals of one of the transmitting-receiving units and another one of the transmitting-receiving units are compared with respect to phase values.

13. A method according to claim 12, further including using the comparison of the phase values to determine an angle.

14. A method according to claim 13, wherein using the comparison of the phase to determine an angle includes using a phase monopulse method or an interferometric method, or an SAR reconstruction method, or a broadband holography method.

15. The method of claim 1, wherein the first signal and the further first signal are offset by a specified frequency offset value.

16. The method of claim 1, wherein the forming the comparison-comparison signal comprises mixing the representation of the first comparison signal with the representation of the further comparison signal.

17. The method of claim 1, wherein the forming the comparison-comparison signal comprises correlating the representation of the first comparison signal with the representation of the further comparison signal.

18. A system having spatially-separated non-coherently operating transmitting-receiving units, the system comprising:

at least one first non-coherent transmitting-receiving unit formed to generate a first signal and to transmit said first signal via a path, at least one further non-coherent transmitting receiving unit formed to generate a further first signal and to transmit said further first signal via the path wherein;

the first transmitting-receiving unit is formed to form a comparison signal from the first signal and from the further first signal received from the further transmitting-receiving unit via the path, wherein the comparison signal comprises frequency information, phase information and amplitude information indicative of a difference between the first signal and further first signal receive from the at least one further non-coherent transmitting receiving unit via the path, the further transmitting-receiving unit is formed to form a further comparison signal from the further first signal and from the first signal received from the first transmitting receiving unit via the path, wherein the further comparison signal comprises frequency information, phase information and amplitude information indicative of a difference between the further first signal and the first signal received from the at least one first transmitting-receiving unit via the path, and the further comparison signal is transmitted from the further transmitting-receiving unit to the first transmitting receiving unit;

wherein the first transmitting receiving unit is formed to form a comparison-comparison signal from said comparison signal and the further comparison signal, the forming the comparison-comparison signal comprising mixing or correlating a representation of the first comparison signal with a representation of the further comparison signal at least in part to compensate for variation between respective non-coherently operating oscillators in the at least one first non-coherent transmitting-receiving unit and the at least one further non-coherent transmitting-receiving unit.

19. A system according to claim 18, comprising three or more spatially spaced transmitting-receiving units, in which two or more comparison-comparison signals, which are measured with more than two pairs from two each of the spatially spaced transmitting-receiving units, are used to determine a distance, a position, a velocity or the presence of one of the transmitting-receiving units or the presence of such a transmitting receiving unit or at least one of a distance, a position, a velocity relative to an object or the presence of an object.

20. A system according to claim 18, wherein the first transmitting-receiving unit and at least one such further transmitting-receiving unit or an evaluation device are formed to carry out the formation of the comparison signals and the transmission of the comparison signals.

21. The system of claim 18, wherein the first signal and the further first signal are offset by a specified frequency offset value.

22. The system of claim 18, wherein the forming the comparison-comparison signal comprises mixing the representation of the first comparison signal with the representation of the further comparison signal.

23. The system of claim 18, wherein the forming the comparison-comparison signal comprises correlating the representation of the first comparison signal with the representation of the further comparison signal.

24. An apparatus, comprising:
a first non-coherent transmitting-receiving unit, and
a signal generator and at least one antenna which are formed to generate a first signal and to transmit said first signal via a path,
an arrangement which is formed to form a comparison signal from the first signal and from a further first signal received from a further transmitting-receiving unit via the path, wherein the comparison signal comprises frequency information, phase information and amplitude information indicative of a difference between the first signal and further first signal received from the further transmitting-receiving unit via the path, and further comprising at least one of
(1) an interface which is formed to transmit the comparison signal to the further transmitting-receiving unit, or
(2) an interface which is formed to receive such a further comparison signal, which is generated by the further transmitting-receiving unit, by means of transmission in the first transmitting-receiving unit; and
wherein the system comprises a further comparison unit which is formed to form a comparison-comparison signal from the comparison signal formed in the same transmitting-receiving unit and from the comparison signal transmitted to said transmitting-receiving unit, the forming the comparison-comparison signal comprising mixing or correlating a representation of the first comparison signal with a representation of the further comparison signal at least in part to compensate for variation between respective non-coherently operating oscillators in the first transmitting-receiving unit and the further transmitting-receiving unit.

25. An apparatus according to claim 24, wherein the at least one interface is a data interface.

26. An apparatus according to claim 24, wherein a filter is arranged between the arrangement which outputs the comparison signal and the further comparison unit which forms the comparison-comparison signal, wherein the filter applies the comparison signal to the comparison unit, wherein the filter does not apply a further comparison signal formed in the arrangement upstream of the filter and suppresses the comparison signal formed in the upstream arrangement or provides it to a connection.

27. An apparatus according to claim 24, which comprises a plurality of mutually spatially spaced receiving antennas which is each associated with an arrangement which is formed to form a respective comparison signal from the first signal and from such a further first signal received from such a further transmitting-receiving unit via the path.

28. The apparatus of claim 24, wherein the first signal and the further first signal are offset by a specified frequency offset value.

29. The apparatus of claim 24, wherein the forming the comparison-comparison signal comprises mixing the representation of the first comparison signal with the representation of the further comparison signal.

30. The apparatus of claim 24, wherein the forming the comparison-comparison signal comprises correlating the representation of the first comparison signal with the representation of the further comparison signal.

\* \* \* \* \*